(12) United States Patent
Machin et al.

(10) Patent No.: US 12,265,045 B2
(45) Date of Patent: Apr. 1, 2025

(54) APPARATUS AND METHOD FOR DETERMINING A CHARACTERISTIC OF A MATERIAL USING AN ELECTROMAGNETIC FINGERPRINT

(71) Applicant: INDUSTRIAL TOMOGRAPHY SYSTEMS LTD., Manchester (GB)

(72) Inventors: Thomas David Machin, Manchester (GB); Hsin-Yu Wei, Manchester (GB)

(73) Assignee: INDUSTRIAL TOMOGRAPHY SYSTEMS LTD., Manchester (GB)

( * ) Notice: Subject to any disclaimer, the term of this patent is extended or adjusted under 35 U.S.C. 154(b) by 261 days.

(21) Appl. No.: 17/907,522

(22) PCT Filed: Mar. 30, 2021

(86) PCT No.: PCT/GB2021/050792
§ 371 (c)(1),
(2) Date: Sep. 27, 2022

(87) PCT Pub. No.: WO2021/198679
PCT Pub. Date: Oct. 7, 2021

(65) Prior Publication Data
US 2023/0147351 A1  May 11, 2023

(30) Foreign Application Priority Data
Mar. 30, 2020 (GB) ........................ 2004601

(51) Int. Cl.
*G01N 27/04* (2006.01)
*G01F 1/66* (2022.01)
*G01N 9/00* (2006.01)

(52) U.S. Cl.
CPC ............ *G01N 27/045* (2013.01); *G01F 1/66* (2013.01); *G01N 9/00* (2013.01)

(58) Field of Classification Search
None
See application file for complete search history.

(56) References Cited

U.S. PATENT DOCUMENTS

2017/0241929 A1\* 8/2017 Qui .......................... G01N 9/00
2018/0292484 A1\* 10/2018 Hoppe ................... G06N 3/045
(Continued)

FOREIGN PATENT DOCUMENTS

DE           4332257 A1 \*  3/1995  ........... A61B 5/0536
WO      2017077293 A1      5/2017

OTHER PUBLICATIONS

Chen, et al., "A Novel Algorithm for High-Resolution Magnetic Induction Tomography Based on Stacked Auto-Encoder for Biological Tissue Imaging," IEEE Access, vol. 7, current version dated Dec. 31, 2019, (pp. 185597-18606).
(Continued)

*Primary Examiner* — Suman K Nath
*Assistant Examiner* — Nigel H Plumb
(74) *Attorney, Agent, or Firm* — Michael Best & Friedrich LLP

(57) ABSTRACT

Apparatus and method for determining a characteristic of a material within a region. One apparatus includes a first plurality of electrodes, a stimulation monitor monitoring an electrical parameter at a plurality of other electrodes of said first plurality of electrodes in response to an applied stimulation signal, a monitor, and a controller. The stimulation monitor generating a received stimulation signal for each of said plurality of other electrodes. The monitor generating a series of data values, each data value being indicative of a phase difference and/or an amplitude relationship between the applied stimulation signal and the received stimulation signal associated with one of the plurality of other electrodes, said series of data values defining an electromagnetic fingerprint. The controller configured to: receive the elec-
(Continued)

tromagnetic fingerprint, identify an interrelationship between at least some of the data values of the electromagnetic fingerprint, and determine the characteristic based on the interrelationship.

25 Claims, 15 Drawing Sheets

(56) References Cited

U.S. PATENT DOCUMENTS

2019/0033974 A1* 1/2019 Mu ..................... G06F 3/011
2019/0250084 A1* 8/2019 Primrose ................ G01F 1/56

OTHER PUBLICATIONS

Great Britain Search Report for Application No. GB2004601.7 dated Jan. 5, 2021, (2 pages).
International Search Report and Written Opinion for Application No. PCT/GB2021/050792 dated Jul. 9, 2021 (18 pages).

* cited by examiner

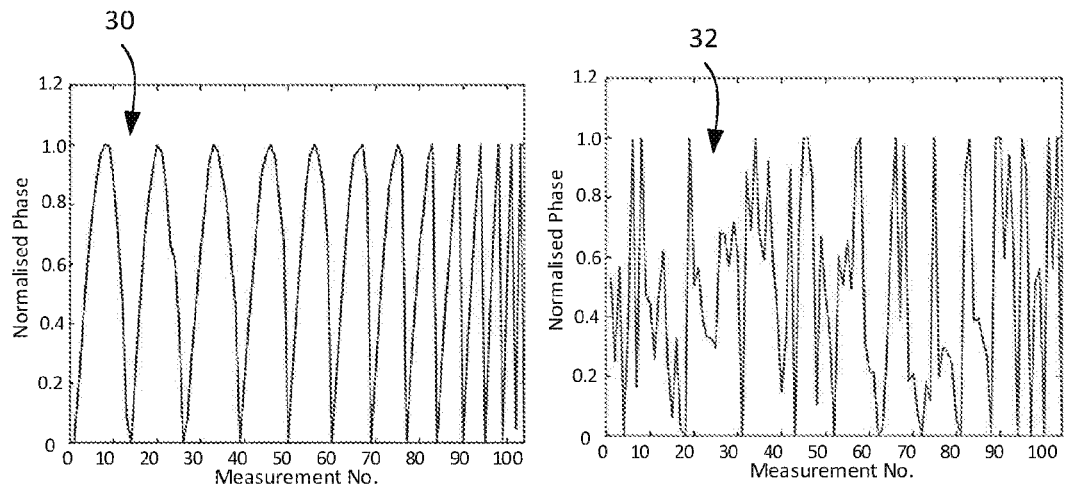
FIG 3A FIG 3B
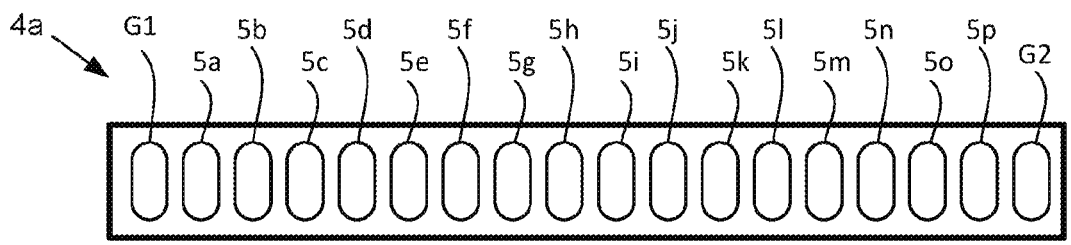
FIG 4
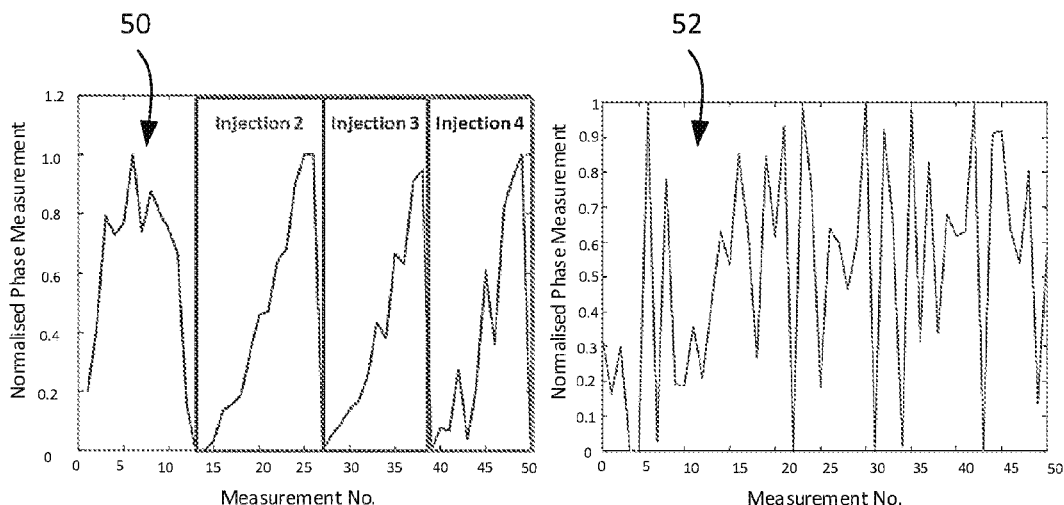
FIG. 5A FIG. 5B

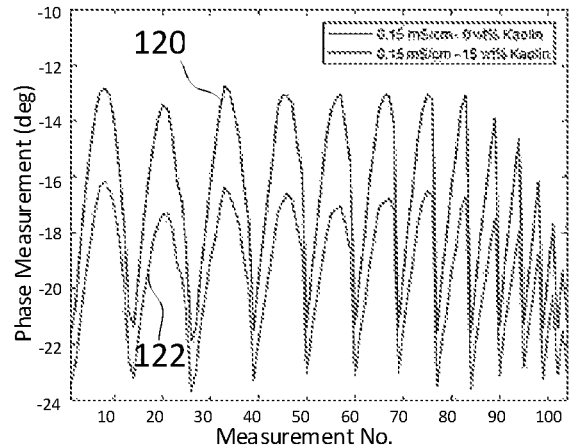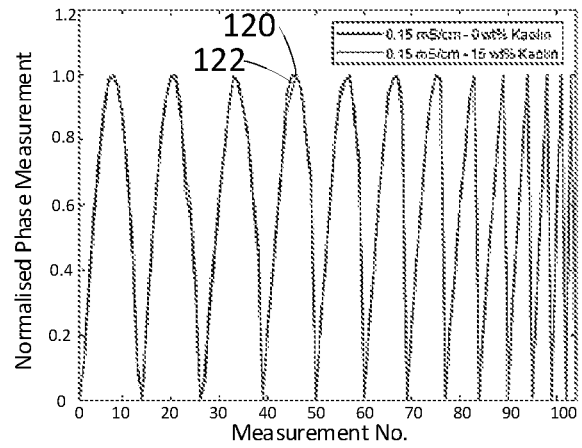
FIG 12A  FIG 12B
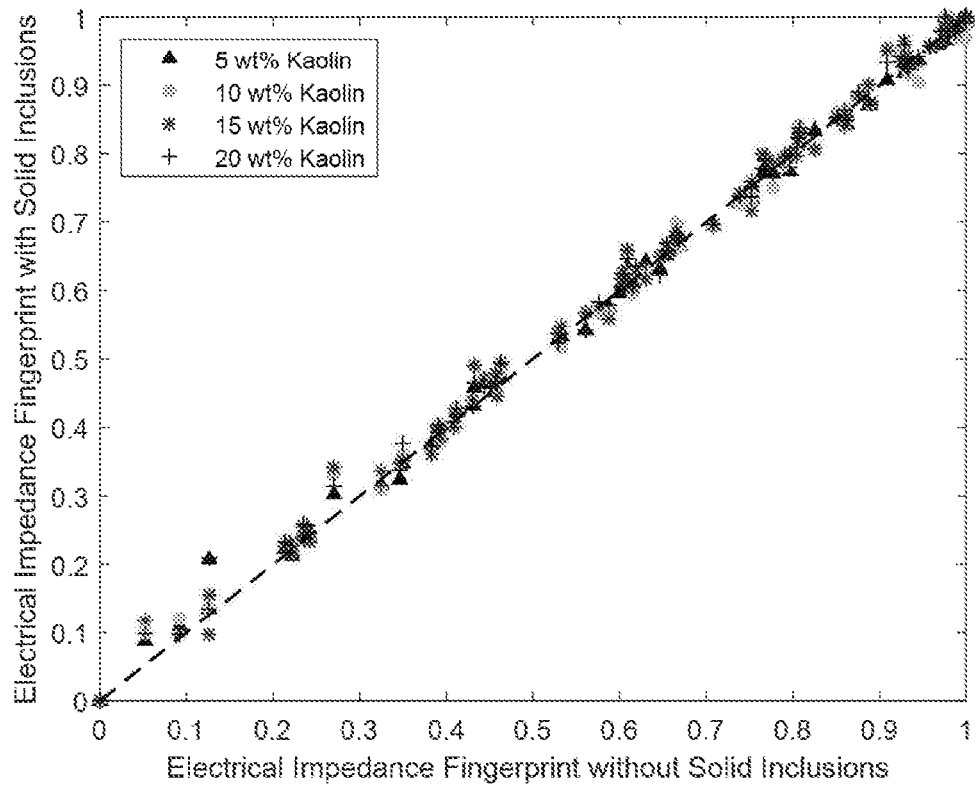
FIG 13

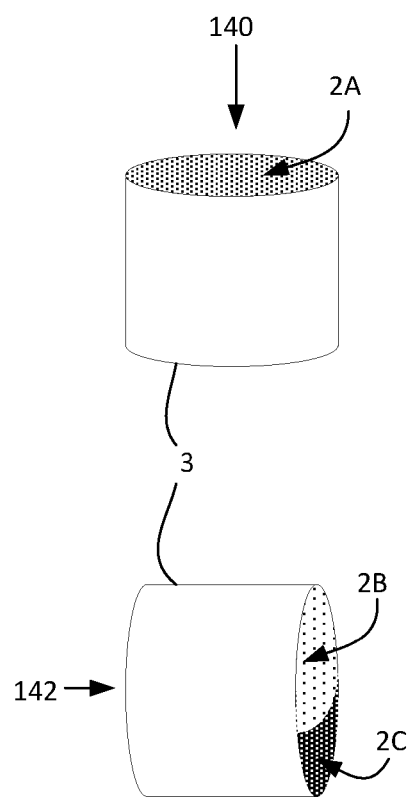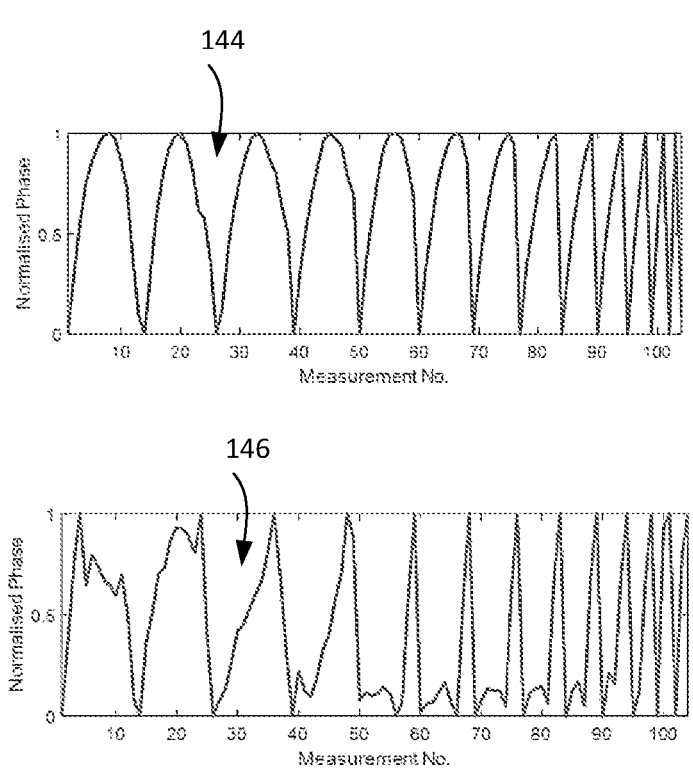
FIG 15A
FIG 15B

APPARATUS AND METHOD FOR DETERMINING A CHARACTERISTIC OF A MATERIAL USING AN ELECTROMAGNETIC FINGERPRINT

CROSS REFERENCE TO RELATED APPLICATIONS

This application is a national stage filing under 35 U.S.C. § 371 of International Patent Application No. PCT/GB2021/050792, filed Mar. 30, 2021, which claims priority to United Kingdom Patent Application No. 2004601.7, filed Mar. 30, 2020, the entire contents of which are hereby incorporated by reference herein.

The present invention relates to an apparatus and method for determining a characteristic of a material. More particularly, but not exclusively, the invention relates to an apparatus for measuring a characteristic of material within a region of interest, such as, for example, within a pipe.

BACKGROUND

Many industrial, environmental and marine engineering systems rely on the transport of solid particulate-fluid mixtures within pipes. For example, hydraulic conveying can be applied to raw minerals and manufactured products. Other process manufacturing systems rely on the processing of formulations in pipes and/or vessels. These formulations are typically solid particular-fluid mixtures. Solid particulates are any material which comprises discrete particles, each particle having a physical boundary and each particle being small in relation to its environment (e.g. a grain of sand within a pipeline having a diameter of one metre). Solid particulates may be dense and non-porous, (such as, for example grains of mineral or rock). Alternatively, solid particulates may be semi-soft and porous, (such as for example aggregates or biological flocs). The fluids within such mixtures may be gas, liquid gas, aqueous or non-aqueous continua. In many industrial applications, fluids are aqueous. Such mixtures may be referred to as slurries or formulations.

Knowledge of the characteristics of the mixtures can allow the mixtures to be transported, monitored and controlled. By periodically sampling the mixture, and measuring the contents of the samples, these characteristics can be estimated. However, non-uniform distribution of solids within a mixture, and a fraction of solids which changes with time may result in any such sampling providing an estimate of limited accuracy.

One way of achieving a more accurate measure of the characteristics of a mixture is by use of a measurement system. An example of such a measurement system is a gamma densitometer. A gamma densitometry may present an environmental hazard by virtue of its radioactive source. Electrical Impedance Tomography (EIT) provides a non-nuclear alternative to this measurement technique. EIT uncovers information about the nature and distribution of materials within a region via the acquisition of signals obtained from sensing electrodes located about or within the region. A measurement system provided for the use of EIT is described in WO 2016/038391.

However, to optimise EIT measurement, there is a requirement to identify a reference conductivity of liquid phase material in the mixture. A conductivity probe may be used, but to function appropriately the conductivity probe is required to be submersed in the liquid phase without the presence of solids. Providing a conductivity probe in-line at such a sensing location is problematic due to space and access reasons. Alternatively, the conductivity of a reference liquid (i.e. the reference conductivity) may be tested at a remote location, but the reference conductivity is highly unlikely to be representative of the in-line liquid phase.

Additionally, EIT may be slow and/or computationally intensive. For example, to form a tomogram of a material (i.e. a map of a characteristic of the material within the region), a large number of measurements and calculations are required. Some calculations include determining a characteristic of multiple sub-regions of the region. Such calculations may be time consuming. As a result, accurate real-time analysis may be difficult to acquire.

It is an object of the present invention to provide a measurement system which overcomes one or more of the problems associated with known measurement systems, discussed above or otherwise.

SUMMARY OF INVENTION

According to a first aspect of the invention, there is provided an apparatus for determining a characteristic of a material within a region, the apparatus comprising a first plurality of electrodes disposed within or about the region, an energisation source arranged to apply an applied stimulation signal to at least one of said first plurality of electrodes, a stimulation monitor arranged to monitor an electrical parameter at a second plurality of said first plurality of electrodes in response to said applied stimulation signal, the stimulation monitor being configured to generate a received stimulation signal for each of said second plurality of electrodes, a phase monitor configured to generate a series of data values, each data value being indicative of a phase difference between the applied stimulation signal and a received stimulation signal associated with one of the second plurality of electrodes, said series of data values defining a phase fingerprint, and a controller configured to receive the phase fingerprint, identify an interrelationship between at least some of the data values of the phase fingerprint, and determine the characteristic based on the interrelationship.

According to another aspect of the invention, there is provided an apparatus for determining a characteristic of a material within a region, the apparatus comprising a first plurality of electrodes disposed within or about the region, an energisation source arranged to apply an applied stimulation signal to at least one of said first plurality of electrodes, a stimulation monitor arranged to monitor an electrical parameter at a second plurality of said first plurality of electrodes in response to said applied stimulation signal, the stimulation monitor being configured to generate a received stimulation signal for each of said second plurality of electrodes, a monitor configured to generate a series of data values, each data value being indicative of an amplitude relationship between the applied stimulation signal and a received stimulation signal associated with one of the second plurality of electrodes, said series of data values defining an amplitude fingerprint, and a controller configured to receive the amplitude fingerprint, identify an interrelationship between at least some of the data values of the amplitude fingerprint, and determine the characteristic based on the interrelationship.

The amplitude fingerprint and phase fingerprint may each be referred to as an electromagnetic fingerprint. The above aspects may be used in combination or alone. That is, there is provided an apparatus for determining a characteristic of a material within a region, the apparatus comprising a first plurality of electrodes disposed within or about the region, an energisation source arranged to apply an applied stimulation signal to at least one of said first plurality of electrodes, a stimulation monitor arranged to monitor an electrical parameter at a second plurality of said first plurality of electrodes in response to said applied stimulation signal, the stimulation monitor being configured to generate a received stimulation signal for each of said second plurality of electrodes, a monitor configured to generate a series of data values, each data value being indicative of a phase difference and/or an amplitude relationship between the applied stimulation signal and a received stimulation signal associated with one of the second plurality of electrodes, said series of data values defining an electromagnetic fingerprint, and a controller configured to receive the electromagnetic fingerprint, identify an interrelationship between at least some of the data values of the electromagnetic fingerprint, and determine the characteristic based on the interrelationship. The electromagnetic fingerprint may comprise a phase fingerprint and an amplitude fingerprint.

Beneficially, by determining a characteristic of a material using the phase fingerprint of the material, the characteristic may be determined relatively quickly and/or with reduced computational complexity and/or with increased accuracy compared to other apparatus. There may be one or more interrelationships between data values of the phase fingerprint. The interrelationships may be referred to as a pattern formed by the data values of the phase fingerprint.

The characteristic may be, for example, a density, a concentration of one or more substances (e.g. salt, solid inclusions), a conductivity, a liquid phase conductivity, a process condition, a flow condition, a cleanliness, a stability, a pH, an admittivity, etc. The characteristic may be a characteristic of more than one materials, for example a mixture.

The controller further may comprise a machine learning model. The machine learning model may be trained, using a training set of phase fingerprints representing a set of materials, to generate trained parameters. The machine learning model may be arranged to receive the phase fingerprint as an input to the trained machine learning model, identify the interrelationship using the trained parameters and generate, based on the interrelationship, data indicating the characteristic.

The machine learning model may additionally or alternatively be trained using a training set of amplitude fingerprints. The machine learning model may be arranged to receive the amplitude fingerprint as an input to the trained machine learning model, identify the interrelationship using the trained parameters and generate, based on the interrelationship, data indicating the characteristic.

Beneficially, by providing a phase fingerprint and/or amplitude fingerprint as an input to the trained machine learning model, interrelationships between data values, and the relationship between interrelationships and characteristics of the material, may be identified. By providing a phase fingerprint and/or amplitude fingerprint as an input to the trained machine learning model, a more accurate and/or detailed determination of a characteristic of the may be performed.

The known phase fingerprints (i.e. the training set of phase fingerprints) and/or known amplitude fingerprints (i.e. the training set of or amplitude fingerprints) may be generated using electrodes arranged with the same geometry as the first plurality of electrodes. The first plurality of electrodes may be arranged circumferentially with a specific diameter. The known phase fingerprints and/or amplitude fingerprints may be generated using electrodes arranged circumferentially with the same specific diameter or with a different diameter. The machine learning model may determine the characteristic in the form of a value (i.e. using regression) or in the form of a group of characteristics (i.e. classification).

The machine learning model may be trained using a set of known phase fingerprints and/or known amplitude fingerprint representing a set of materials for which the characteristic is known. That is, the machine learning model may be trained using supervised learning.

The machine learning model may be trained using a set of known phase fingerprints and/or known amplitude fingerprints representing a set of materials for which the characteristic is unknown. That is, the machine learning model may be trained using unsupervised learning. A k-means clustering algorithm may be used to train the machine learning model.

The known phase fingerprints and/or known amplitude fingerprints, whether representing a set of materials for which the characteristic is known or unknown, may refer to any fingerprint used for training. Such fingerprints may be referred to as training phase fingerprints.

The first plurality of electrodes may be arranged with a first geometry. The known phase fingerprints and/or amplitude fingerprints may be generated using a third plurality of electrodes. The third plurality of electrodes may be arranged with a second geometry substantially equivalent to the first geometry.

The first and second geometry may be circumferential, for example circumferential about a pipe. The first and second geometry may be linear, for example linear along a linear length of material. The first geometry may have a different scale to the second geometry. For example, the first geometry may be circumferential with a first diameter and the second geometry may be circumferential with a second diameter, wherein the second diameter is larger than the first diameter. The third plurality of electrodes may comprise the first plurality of electrodes.

The machine learning model may comprise a neural network. The neural network may comprise any number of neurons, for example ten neurons, forty neurons, or one hundred neurons. The neural network may comprise an input layer, a hidden layer, and an output layer. The neural network may be trained with a training algorithm for example Levenberg-Marquadt, scaled conjugate gradients or Bayesian regularisation.

The phase fingerprint and/or amplitude fingerprint may be generated using only a subset of the first plurality of electrodes. Beneficially, the use of only a subset first plurality of the electrodes allows a determination of a characteristic of the material to be determined with a reduced number of measurements and/or reduced processing power and/or increased speed.

The apparatus may be used to determine a characteristic of the material if one or more of the first plurality of electrodes of the plurality of electrodes fails.

The apparatus may be used to determine a characteristic of the material primarily associated with a subregion of interest within the region. For example, a subset of electrodes arranged generally about a liquid phase portion of the material within the region may used to generate a phase fingerprint and/or amplitude fingerprint primarily associated with the liquid phase portion. Any number of electrodes may be used as part of the subset of electrodes, for example eight electrodes or all but one of the first plurality of electrodes.

The subset of electrodes may be adjacent a subregion of interest within the region. The subset of electrodes may be placed around or within the subregion of interest. The subregion of interest may be a subregion within which the material comprises a particular phase of matter. For example the subset of electrodes may be adjacent a portion of the region comprising substantially liquid material. Beneficially, this allows the liquid phase conductivity to be determined with a reduced number of measurements and/or reduced processing power. As a result, this process may be performed more quickly than using all the available electrodes The characteristic may be determined using only a subset of the series of data values. Beneficially, using only a subset of the series of data values to determine the characteristic may provide a faster and/or less computationally intensive determination of the characteristic The characteristic may comprise liquid phase conductivity. Liquid phase conductivity is defined as the conductivity of liquid phase matter in a mixture. Beneficially, the liquid phase conductivity can be determined using a phase fingerprint.

According to another aspect of the invention, there is provided a density measurement system. The density measurement system comprises the apparatus of the previous aspects. The liquid phase conductivity determined by the apparatus may be provided to the density measurement system as a reference value for generating data indicative of a density of the material.

The density measurement system may comprise an electrical impedance tomography (EIT) system. The density measurement system may generate data indicative of the complex impedance of the material within the region. The data indicative of a density of the material may be generated based on the data indicative of the complex impedance of the material. The data indicative of the complex impedance of the material and/or the data indicative of the density of the material may be generated at least partially based on the reference value.

The density measurement system may comprise a fourth plurality of electrodes. The fourth plurality of electrodes may cooperate with the controller to generate data indicative of the complex density of the material.

The first plurality of electrodes may comprise at least some of the fourth plurality of electrodes. That is, electrical impedance tomography and the determination of a characteristic of the material using a phase fingerprint may be performed generally simultaneously using the same apparatus.

At least a subset of the first plurality of electrodes may be distinct from the fourth plurality of electrodes. The first plurality of electrodes, or subset of the first plurality of electrodes, may be provided as a secondary sensor in addition to the fourth plurality of electrodes.

The first plurality of electrodes may be arranged generally circumferentially about the region. The electrodes may be mounted on the inner wall of a pipe or vessel. The electrodes may be approximately equally spaced about the circumference. In alternative arrangements with non-circular pipes, the electrodes may be mounted on the inner wall of the pipe such that they are arranged about the region but non-circumferentially about the region. For example, the electrodes may form a rectangular array about the region.

The first plurality of electrodes may be arranged linearly along a linear structure. The linear structure may be fixedly located within the region. The linear structure may be removably located within the region. The linear structure may be inserted into and removed from the region.

According to another aspect of the invention, there is provided a computer implemented method for determining a characteristic of a material within a region. The method comprises receiving a phase fingerprint, the phase fingerprint being defined by a series of data values, each data value being indicative of a phase difference between an applied stimulation signal applied to at least one of a first plurality of electrodes disposed within or about the region and a received stimulation signal received at each of a second plurality of said first plurality of electrodes in response to said applied stimulation, identifying an interrelationship between at least some of the data values of the phase fingerprint, and determining the characteristic based on the interrelationship.

According to another aspect of the invention, there is provided a computer implemented method for determining a characteristic of a material within a region. The method comprises receiving an amplitude fingerprint, the amplitude fingerprint being defined by a series of data values, each data value being indicative of an amplitude relationship between an applied stimulation signal applied to at least one of a first plurality of electrodes disposed within or about the region and a received stimulation signal received at each of a second plurality of said first plurality of electrodes in response to said applied stimulation, identifying an interrelationship between at least some of the data values of the amplitude fingerprint, and determining the characteristic based on the interrelationship.

The amplitude fingerprint and phase fingerprint may each be referred to as an electromagnetic fingerprint. As such, there is provided a computer implemented method for determining a characteristic of a material within a region, the method comprising receiving an electromagnetic fingerprint, the electromagnetic fingerprint being defined by a series of data values, each data value being indicative of a phase difference and/or amplitude relationship between an applied stimulation signal applied to at least one of a first plurality of electrodes disposed within or about the region and a received stimulation signal received at each of a second plurality of said first plurality of electrodes in response to said applied stimulation, identifying an interrelationship between at least some of the data values of the electromagnetic fingerprint, and determining the characteristic based on the interrelationship.

Receiving the phase fingerprint and/or amplitude fingerprint may comprise inputting the phase fingerprint into a trained machine learning model. The trained machine learning model may have been trained, using a training set of phase fingerprints and/or amplitude fingerprints representing a set of materials, to generate trained parameters. The trained machine learning model may have been trained using a training set of known phase fingerprints and/or known amplitude fingerprints representing a set of materials for which the characteristic is known. The trained machine learning model may have been trained using a training set of known phase fingerprints and/or known amplitude fingerprints representing a set of materials for which the characteristic is unknown. The trained machine learning model may be arranged to identify the interrelationship using the trained parameters and generate, based on the interrelationship, data indicating the characteristic. Determining the characteristic may comprise receiving, as an output of the trained machine learning model, the data indicating the characteristic.

The method may further comprise normalising the phase fingerprint prior to identifying the interrelationship. Beneficially, by normalising phase fingerprint data, the characteristic of a material may be determined more accurately.

According to another aspect of the invention, there is provided a method of determining a stability of a material within a region. The method comprises receiving a first phase fingerprint, the first phase fingerprint being defined by data indicative of a phase difference between an applied stimulation signal applied to at least one of a first plurality of electrodes disposed within or about the region and a received stimulation signal received at a second plurality of said first plurality of electrodes in response to said applied stimulation within a first time period, receiving a second phase fingerprint, the second phase fingerprint being defined by data indicative of a phase difference between an applied stimulation signal applied to at least one of a first plurality of electrodes disposed within or about the region and a received stimulation signal received at a second plurality of said first plurality of electrodes in response to said applied stimulation within a second time period, the second time period being later than the first time period, comparing the first and second phase fingerprints and determining a stability of the material between the first time period and the second time period based on the comparison.

Instead of, or in addition to, performing the method of determining a stability of the material with phase fingerprints, the method may be performed using amplitude fingerprints. As such, according to another aspect of the invention, there is provided a method of determining a stability of a material within a region, the method comprising receiving a first electromagnetic fingerprint, the first electromagnetic fingerprint being defined by data indicative of a phase difference and/or amplitude relationship between an applied stimulation signal applied to at least one of a first plurality of electrodes disposed within or about the region and a received stimulation signal received at a second plurality of said first plurality of electrodes in response to said applied stimulation within a first time period, receiving a second electromagnetic fingerprint, the second electromagnetic fingerprint being defined by data indicative of a phase difference and/or amplitude relationship between an applied stimulation signal applied to at least one of a first plurality of electrodes disposed within or about the region and a received stimulation signal received at a second plurality of said first plurality of electrodes in response to said applied stimulation within a second time period, the second time period being later than the first time period, comparing the first and second electromagnetic fingerprints, and determining a stability of the material between the first time period and the second time period based on the comparison. The electromagnetic fingerprint may comprise a phase fingerprint or an amplitude fingerprint.

The comparison may comprise a calculation of a difference between the first and second phase fingerprints and/or amplitude fingerprints. The comparison may comprise an identification of a relationship between the data values of the first phase fingerprint and the data values of the second phase fingerprint. The comparison may comprise an identification of a relationship between the data values of the first amplitude fingerprint and the data values of the second amplitude fingerprint. The comparison may comprise the identification of a first interrelationship between the data values of the first phase fingerprint and/or first amplitude fingerprint and the identification of a second interrelationship between the data values of the second phase fingerprint and/or second amplitude fingerprint and the calculation of a difference between the first interrelationship and the second interrelationship. The comparison may comprise the determination of a first characteristic associated with the first phase fingerprint and/or first amplitude fingerprint and the determination of a second characteristic associated with the second phase fingerprint and/or second amplitude fingerprint and the calculation of a difference between the first and second characteristic.

According to another aspect of the invention, there is provided a method of determining a stability of a material within a region. The method comprises performing the method of the previous aspect over a first time period to determine a first characteristic of the material within the first time period, performing the method of aspect three over a second time period to determine a second characteristic of the material within the second time period, comparing the first and second characteristic and determining a stability of the material between the first time period and the second time period based on the comparison.

The method may further comprise, upon determination that the stability surpasses a stability threshold, classifying the second fingerprint as a stable fingerprint, and performing an action based on the determination.

The action may comprise generating an indication of the characteristic of the material in the region. It may be beneficial to determine a characteristic during a time period in which the material is determined to be stable. This characteristic may be referred to as a stable characteristic.

Classifying the second fingerprint as a stable fingerprint may further comprise classifying the material as stable (i.e. in a state that is stable). The classification may apply from the second time period. The classification may apply only to the second time period.

An instability threshold may be used in place of a stability threshold. An instability threshold may be used to indicate that cleaning is required. In an industrial process, a stability which surpasses an instability threshold may indicate that cleaning is required. As such, the action may comprise an indication that the region is unclean, and optionally an instruction to initiate cleaning.

According to another aspect of the invention, there is provided a method of identifying a low-solid flow regime comprising the method of the previous aspect and further comprising, upon determination that the stability surpasses a stability threshold, classifying the flow regime as a low-solid flow regime.

According to another aspect of the invention, there is provided a method of identifying a process condition comprising the method of the above aspect for providing a method of determining a stability of a material within a region and further comprising, upon determination that the stability surpasses a stability threshold, classifying the process condition as complete.

In chemical processing, it may be beneficial to monitor the characteristic of a material in a region over time. For example, it may be beneficial to determine when a chemical process is complete. A stable phase fingerprint and/or stable amplitude fingerprint may indicate that a chemical process is complete i.e. the mixture is not changing any more. As such, the action may comprise an indication that the process is complete, and optionally an instruction to end the process and/or initiate a different process.

In industrial procedures which use clean-in-place processes, it may be beneficial to monitor a characteristic of the material over time. The characteristic may be cleanliness. For example, it may be beneficial to determine whether the state of a region is clean or unclean. A stable fingerprint may indicate a mixture that is mainly liquid and hence clean. An unstable fingerprint may indicate a mixture with a high volume of solid inclusions and hence is unclean to some degree. In a clean-in-place process, a stability which surpasses the stability threshold may indicate that cleaning is complete. As such, the action may comprise an indication that the region is clean, and optionally an instruction to stop cleaning.

The action of any of the above aspects relating to determining stability may comprise applying a calibration.

The calibration may be calculated, at least in part, depending on the determined characteristic of the material. The calibration comprise be an adjustment calculated based on a characteristic generated during a time period in which the material is determined to be stable.

According to another aspect of the invention, there is provided a method of training a machine learning model to determine a characteristic of a material within a region, the method comprising providing, to the model, one or more known phase fingerprints, each known phase fingerprint being defined by a series of data values, each data value being indicative of a phase difference between an applied stimulation signal applied to at least one of a first plurality of electrodes disposed within or about the region and a received stimulation signal received at each of a second plurality of said first plurality of electrodes in response to said applied stimulation, identifying, by the model, one or more interrelationships between at least some of the data values of the known phase fingerprints, and generating, by the model, trained parameters based on the interrelationships.

According to another aspect of the invention, there is provided a method of training a machine learning model to determine a characteristic of a material within a region, the method comprising providing, to the model, one or more known amplitude fingerprints, each known amplitude fingerprint being defined by a series of data values, each data value being indicative of an amplitude relationship between an applied stimulation signal applied to at least one of a first plurality of electrodes disposed within or about the region and a received stimulation signal received at each of a second plurality of said first plurality of electrodes in response to said applied stimulation, identifying, by the model, one or more interrelationships between at least some of the data values of the known amplitude fingerprints, and generating, by the model, trained parameters based on the interrelationships.

The amplitude fingerprint and phase fingerprint may each be referred to as an electromagnetic fingerprint. As such, according to another aspect of the invention, there is provided a method of training a machine learning model to determine a characteristic of a material within a region, the method comprising providing, to the model, one or more known electromagnetic fingerprints, each known electromagnetic fingerprint being defined by a series of data values, each data value being indicative of a phase difference and/or an amplitude relationship between an applied stimulation signal applied to at least one of a first plurality of electrodes disposed within or about the region and a received stimulation signal received at each of a second plurality of said first plurality of electrodes in response to said applied stimulation, identifying, by the model, one or more interrelationships between at least some of the data values of the known electromagnetic fingerprints, and generating, by the model, trained parameters based on the interrelationships.

The model may initially comprise initialised parameters. The initialised parameters may be replaced by trained parameters following training. The trained parameters may comprise weights and/or biases associated with the model.

The one or more known phase fingerprints and/or amplitude fingerprints are generated using a first plurality of electrodes in a first geometry, the first geometry being substantially equivalent to a second geometry, wherein the second geometry is intended for use in generating phase fingerprints and/or amplitude fingerprints for the determination of the characteristic of the material within the region.

According to another aspect of the invention there is provided a data processing apparatus comprising means for carrying out the steps of any of the above methods.

According to another aspect of the invention there is provided a computer program comprising instructions which, when the program is executed by a computer, cause the computer to carry out the steps of any of the above methods.

According to another aspect of the invention there is provided a computer-readable medium comprising instructions which, when executed by a computer, cause the computer to carry out the steps of any of the above methods.

With reference to the above aspects relating to apparatus or density measurement systems, the material may comprise a mixture having a liquid phase portion and a solid phase portion. The material may optionally also have a gas phase portion.

The region of interest may be within a pipe through which the material is configured to flow. The apparatus may be used to monitor a characteristic of a material flowing in a pipe.

The region of interest may be within a vessel configured to contain the material. The vessel may be further configured to mix the material. The apparatus may be used to monitor a characteristic of a material within the vessel.

The material may comprise a mixture having a gas phase portion. The material may optionally also comprise a liquid phase portion and/or a solid phase portion.

The characteristic may comprise one or more of: an indication of a presence of one or more substances in the material, a concentration of one or more substances in the material, a flow regime of the material, a stability.

According to another aspect of the invention there is provided an industrial processing apparatus comprising any of the above described aspects relating to apparatus or density measurement systems.

The industrial processing apparatus may further comprise a mining apparatus. The characteristic, primary characteristic or secondary characteristic may comprise one or more of: an indication of a presence of one or more substances in the material, a concentration of one or more substances in the material. Beneficially, the use of such an apparatus may enable important substances to be identified in an ore. Furthermore, the apparatuses described herein enable such material to be characterised despite the relatively inaccessible nature of mining environments. In particular, a liquid phase conductivity value may be determined. The indication of the presence of one or more substances may be expressed as a classification.

The industrial processing apparatus may further comprise a dredging apparatus. The material may be a slurry. The characteristic may comprise one or more of: a density of the slurry, a concentration of one or more portions of the slurry, a flow regime of the slurry.

The industrial processing apparatus may further comprise a manufacturing system. The material may comprise a formulation. The characteristic may comprise one or more of: an indication of one or more substances in the formulation, a concentration of one or more substances in the formulation, a stability of a manufacturing process, a cleanliness of the manufacturing system.

The industrial processing apparatus may further comprise a transport system. The transport system may be, for example, a petroleum transport system configured to transport components of a petroleum extraction operation. The material may comprise a mixture having a gas phase portion. The characteristic may comprise a characteristic of the gas phase portion. For example, the gas characteristic may comprise an amount of gas, a gas density, an indication of the presence of a type of gas.

When comprising a machine learning model as described above, the electromagnetic fingerprint may be a primary electromagnetic fingerprint, the interrelationship may be a primary interrelationship, the characteristic may be a primary characteristic, and the monitor may be further configured to generate a secondary electromagnetic fingerprint comprising a series of data values, each data value of which is indicative of a phase difference and/or an amplitude relationship between the applied stimulation signal and a received stimulation signal associated with one of the second plurality of electrodes. The controller may be further configured to receive the secondary electromagnetic fingerprint; identify a secondary interrelationship between at least some of the data values of the secondary electromagnetic fingerprint; and determine a secondary characteristic based on the interrelationship.

Beneficially, by using two electromagnetic fingerprints, more information may be extracted from the generated data and, as such, more characteristics of the material may be determined.

The controller may further comprise a primary machine learning model trained using a training set of electromagnetic fingerprints representing a set of materials to generate trained parameters. The primary machine learning model may be arranged to receive the primary electromagnetic fingerprint as an input to the trained primary machine learning model, identify the primary interrelationship between at least some of the data values of the first electromagnetic fingerprint using the trained parameters, and generate, based on the primary interrelationship, data indicating the primary characteristic. The controller may further comprise a secondary machine learning model trained using a training set of electromagnetic fingerprints representing a set of materials to generate trained parameters. The secondary machine learning model may be arranged to receive the secondary electromagnetic fingerprint as an input to the trained secondary machine learning model, identify the secondary interrelationship between at least some of the data values of the secondary electromagnetic fingerprint using the trained parameters, and generate, based on the secondary interrelationship, data indicating the secondary characteristic.

The secondary characteristic may comprise one or more of: a concentration of one or more solid substances in the material, an identification of a type of substance in the material, a flow regime of the material, a stability. It should be understood that a concentration may be determined from other related characteristics, for example a density, a mass, an amount.

The primary electromagnetic fingerprint may comprise a phase fingerprint. The primary characteristic may comprise a liquid phase conductivity. The secondary electromagnetic fingerprint may comprise an amplitude fingerprint. The primary characteristic may be used to modify the second electromagnetic fingerprint prior to its receipt by the trained secondary machine learning model. By using the liquid phase conductivity to modify the second electromagnetic fingerprint, the second electromagnetic fingerprint may be corrected such that the effect of any liquid phase portion of the material is minimised or eliminated. As such, this process may beneficially enable effective characterisation of a solid phase portion of the material.

The primary electromagnetic fingerprint may comprise a phase fingerprint. The primary characteristic may comprise a liquid phase conductivity. The primary characteristic may be received by the trained secondary machine learning model. The secondary interrelationship between at least some of the data values of the second electromagnetic fingerprint may be identified further using the primary characteristic.

According to another aspect of the invention there is provided an industrial processing apparatus comprising the apparatus of the previous aspect.

The industrial processing apparatus may further comprise a mining apparatus. The secondary characteristic may comprise one or more of: an indication of a presence of one or more substances in the material, a concentration of one or more substances in the material. Beneficially, the use of such an apparatus may enable important substances to be identified in an ore. Furthermore, the apparatuses described herein enable such material to be characterised despite the relatively inaccessible nature of mining environments. In particular, a liquid phase conductivity value may be determined. The indication of the presence of one or more substances may be expressed as a classification.

The industrial processing apparatus may further comprise a dredging apparatus. The material may be a slurry. The secondary characteristic may comprise one or more of: a density of the slurry, a concentration of one or more portions of the slurry, a flow regime of the slurry.

The industrial processing apparatus may further comprise a manufacturing system. The material may comprise a formulation. The secondary characteristic may comprise one or more of: an indication of one or more substances in the formulation, a concentration of one or more substances in the formulation, a stability of a manufacturing process, a cleanliness of the manufacturing system.

The industrial processing apparatus may further comprise a transport system. The transport system may be, for example, a petroleum transport system configured to transport components of a petroleum extraction operation. The material may comprise a mixture having a gas phase portion. The secondary characteristic may comprise a characteristic of the gas phase portion. For example, the gas characteristic may comprise an amount of gas, a gas density, an indication of the presence of a type of gas.

DESCRIPTION OF FIGURES

The invention will now be described by way of non-limiting example with reference to the following Figures, in which:

FIGS. 3A and 3B show example phase fingerprints capable of being processed by the measurement system shown in FIG. 1;

FIG. 4 shows an alternative arrangement of a part of the measurement system shown in FIG. 1;

FIGS. 5A and 5B show example phase fingerprints capable of being processed by the measurement system shown in FIG. 1;

FIGS. 12A and 12B show example phase fingerprints capable of being processed by the measurement system shown in FIG. 1;

FIG. 13 shows data processed by the measurement system in FIG. 1;

FIGS. 15A and 15B show the flow of mixture in vertical and horizontal pipes, and associated example phase fingerprints capable of being processed by the measurement system shown in FIG. 1, respectively;

DETAILED DESCRIPTION

Figure 1:
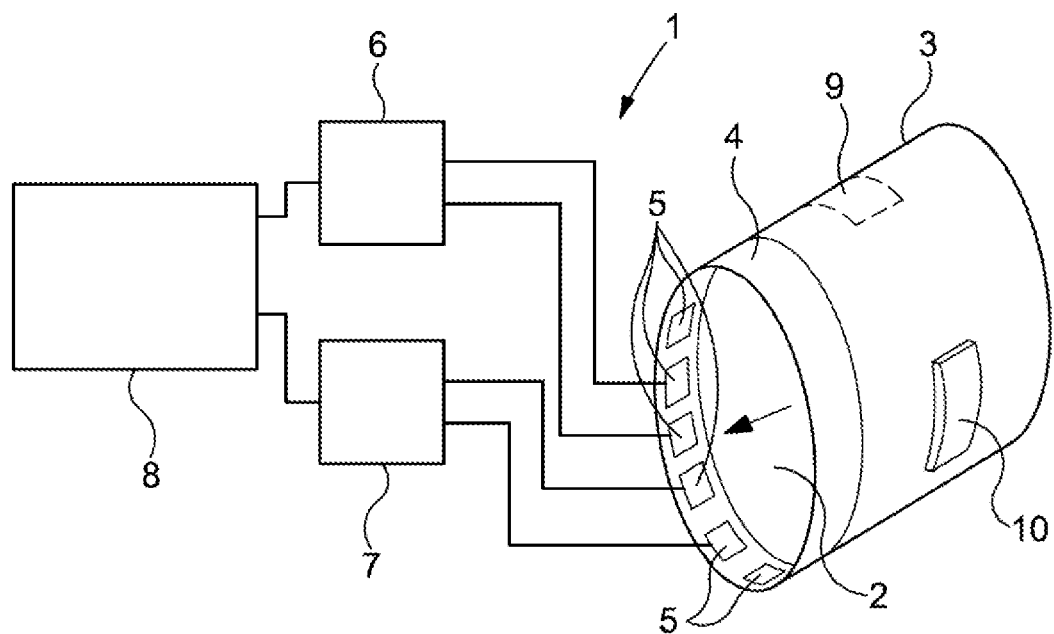
FIG. 1 shows a measurement system according to an embodiment of the invention.

Referring to FIG. 1, a measurement system 1 is shown. The measurement system 1 is arranged to measure a characteristic of a material 2 flowing within a pipe 3. The material 2 is a mixture of multiple components, typically a mixture of liquid and solid components. The measurement system 1 comprises a sensor apparatus 4. The sensor apparatus 4 comprises a circumferential section of the pipe 3, which may be integrally formed with the pipe 3 or may be formed separately. The sensor apparatus 4 has a plurality of electrodes 5. The electrodes 5 are arranged with a particular geometry within the measurement system 1. In the measurement system in FIG. 1, the electrodes 5 are arranged circumferentially within the pipe 3. This arrangement of electrodes may be referred to herein as a circumferential geometry.

A characteristic of the material 2 within a region of interest can be determined using the measurement apparatus 1. The region of interest is defined, in part, by the electrodes 5, for example the radial extent of the region of interest is defined by the electrodes 5. The region of interest is also defined, in part, by the extent to which an electric field applied to one of the electrodes 5 penetrates into the material in the pipe 3, for example the axial extent to which the electric field penetrates.

The pipe 3 may be used for transporting material. The pipe 3 may, for example, form part of a hydraulic conveying apparatus, such as a hydraulic dredging apparatus. Alternatively, the pipe 3 may, for example, form part of a product process pipeline, such as a process for producing home care products. Rather than a pipe 3, the pipe 3 may, for example, form part of a vessel, such as a vessel for mixing an initially inhomogeneous mixture of materials.

Figure 2:
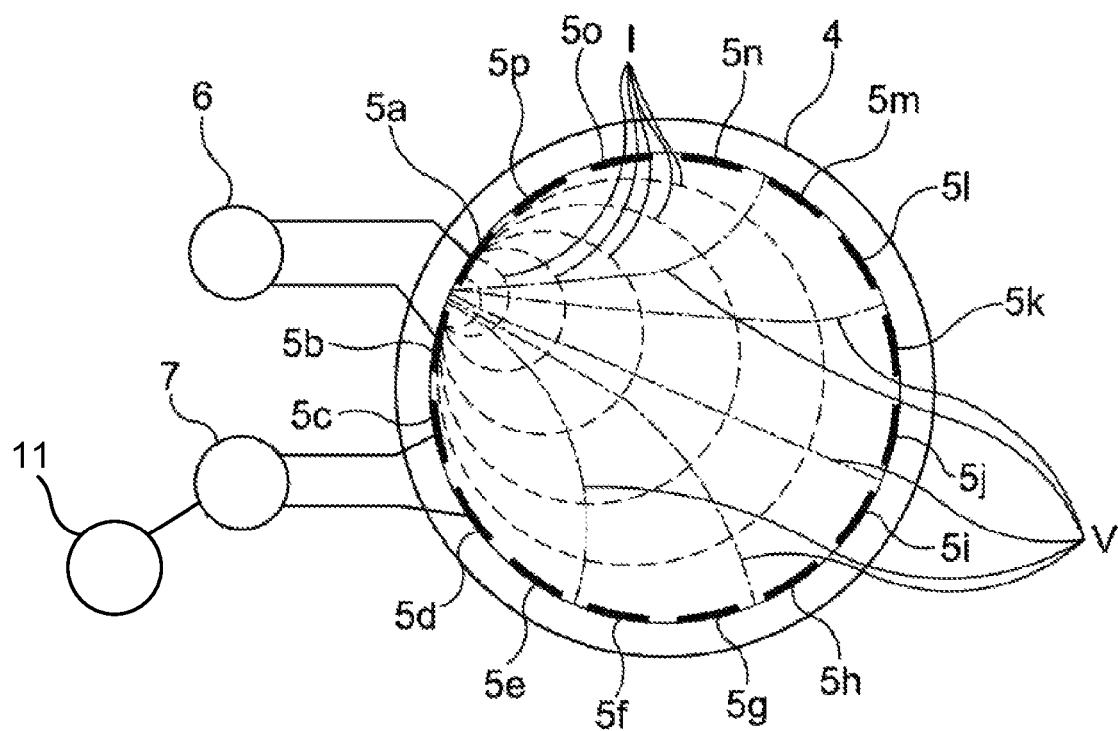
FIG. 2 shows a part of the measurement system shown in FIG. 1 in more detail.

The measurement system 1 further comprises an energisation source 6, a stimulation monitor 7, a phase monitor 11, and a controller 8. The controller 8 may be a programmable logic controller (PLC), such as, for example, a PLC manufactured by Bachmann electronic GmbH, Feldkirch, Austria. The energisation source 6 may comprise a current source. The controller 8 controls the energisation source 6, stimulation monitor 7 and phase monitor 11. In FIG. 1 the stimulation monitor 7 and phase monitor 11 are depicted as unitary. However, it should be understood that the phase monitor 11 may be arranged differently, for example it may be a separate component (as depicted in FIG. 2), or may comprise part of the controller 8. The controller 8 also performs processing as described below in more detail. The controller 8 may be referred to as a processor.

The measurement system 1 may also have one or more additional sensing components, for example a secondary sensor and/or a gas fraction probe. For example, the measurement system 1 in FIG. 1 has a secondary sensor 9. The secondary sensor 9 may, for example, be a temperature sensor. The secondary sensor 9 is arranged to measure the temperature of the material 2 within the pipe 3. Alternatively, the secondary sensor 9 may be arranged to measure the temperature of the material 2 prior to being drawn into the pipe 3. The measurement system 1 in FIG. 1 also has a gas fraction probe 10. The gas fraction probe 10 may, for example be an ultrasound probe. The gas fraction probe 10 is arranged to measure the volume of gas (e.g. air) entrained within the material 2 within the pipe 3. Gases, such as air, have a significantly higher attenuation of ultrasound than either liquids or solids (ultrasound attenuation being inversely proportional to density). Therefore, the attenuation of ultrasound by material provides an accurate measure of the proportion of gas, versus solid or liquid.

FIG. 2 illustrates a cross-section through the sensor apparatus 4. The electrodes 5 are arranged circumferentially around the pipe 3. The electrodes 5 may be, for example, equally spaced around the internal surface of the sensor 4. Each of the electrodes 5 is formed from a conductive material, allowing electrical contact to be made between the electrodes 5 and the material 2 within the sensor apparatus 4 (and thus within the pipe 3). The electrodes 5 may be made from an erosion resistant material, such as, for example, stainless steel. The internal surface of the sensor apparatus 4 which is not covered by the electrodes 5 is formed from an erosion resistant material. For example, the internal surface may be formed from a cast rubber or polyurethane material. Alternatively, the internal surface of the sensor apparatus 4 may be covered with replaceable ceramic tiles.

Each of the electrodes 5 is switchably connected to the energisation source 6. In the arrangement of FIG. 2, a first electrode 5a and a second electrode 5b of the electrodes 5 are connected to the energisation source 6. When connected, a circuit is formed by the energisation source 6, the first electrode 5a, the material 2, and the second electrode 5b. In use, an applied stimulation signal is applied to the first or second electrode 5a, 5b. The amplitude and frequency of the applied stimulation signal may be controlled, for example using the controller 8. The applied stimulation signal comprises a periodic signal, for example an alternating current (AC). The AC may have, for example, a frequency of around 4.6 kHz. The use of an AC as an applied stimulation signal may reduce the occurrence of electrolysis at the electrodes 5. Electrodes 5 in a circuit with the energisation source 6, to which an applied stimulation signal may be applied, may be referred to herein as energisation electrodes.

The application of an applied stimulation signal to the first or second electrode 5a, 5b, causes an electric field to be established between the first and second electrodes 5a, 5b. The electric field is not solely contained between the electrodes but permeates through the material 2 within the region. The permeation of an electric field within the material causes current flow and potential differences within the region of interest.

When a current is flowing between the energisation electrodes 5a, 5b, a plurality of current paths exist between the electrodes. The current density is greatest closest to the electrodes 5a, 5b, however, current will flow throughout the material 2, albeit with a reduced current density. Dashed lines I indicate several current paths within the material 2, in response to the application of stimulation to the electrodes 5a, 5b.

The flow of current throughout the material 2 causes a corresponding potential difference distribution throughout the material 2, current flowing from a higher potential to a lower potential. This potential difference distribution is illustrated in FIG. 2 using dash-dot lines V, which represent lines of isopotential within the material 2. That is, all points on each of the lines V have the same electrical potential as each of the other points on the same line V (and a different potential to all points on each of the other lines V). The electrical potential within the material 2 generally decreases from a highest value immediately adjacent to the first electrode 5a, to a lowest value immediately adjacent to the second electrode 5b. It should be understood, however, that where an AC stimulation is applied, the electric potential and electric field will change in accordance with the varying stimulation signal.

Measurements conducted between electrodes which are distant from the energisation electrodes may provide information regarding the electric field in the material 2 in the region of interest. Hence, these measurements may provide information regarding the material in the region of interest.

Each of the electrodes 5 is also switchably connected to the stimulation monitor 7. In the arrangement of FIG. 2, a third electrode 5c and a fourth electrode 5d of the electrodes 5 are connected to the stimulation monitor 7. When connected, a circuit is formed by the stimulation monitor 7, the third electrode 5c, the material 2, and the fourth electrode 5d. In this arrangement, the stimulation monitor 7 is able to measure an electrical parameter at the third and/or fourth electrode 5c, 5d in response to the applied stimulation signal. The measured electrical parameter may be, for example, current or potential difference. The stimulation monitor 7 may use techniques such as phase sensitive detection to measure an electrical parameter having the same frequency as the applied stimulation signal supplied by the energisation source 6. The stimulation monitor 7 is further configured to generate a received stimulation signal associated with the third and/or fourth electrode 5c, 5d, for example based on the monitored electrical parameter.

The received stimulation signal will typically have a different phase to the applied stimulation signal and a different amplitude to the applied stimulation signal, based upon the impedance of the material. That is, the received electrical stimulation, and hence the electrical parameter (e.g. current or potential difference) is complex in nature, where a real portion of the stimulation signal corresponds to a relationship between the amplitude of the received stimulation signal and the applied stimulation signal and an imaginary portion corresponds to the phase difference. As such, the real and/or imaginary portion can be extracted from the monitored stimulation signal. The amplitude relationship may be represented, for example, as a ratio between the amplitude of the applied stimulation signal and the amplitude of the received stimulation signal.

The phase monitor 11 is configured to generate data based on the applied stimulation signal and a corresponding received stimulation signal. In particular, the phase monitor generates a phase value indicative of a phase difference between the applied stimulation signal and a corresponding received stimulation signal. Large particulates, such as, for example, particles of sand, respond quite differently to AC currents than small particles, such as, for example particles of clay. Large particulates typically exhibit a simple resistance (i.e. no phase difference is observed between the applied stimulation signal and a corresponding received stimulation signal). Small particles, on the other hand, typically exhibit a complex impedance (i.e. both real and imaginary parts, resulting in a phase difference) due to their large surface area to volume ratio, and related surface charge effects. Therefore, by generating phase values associated with a material 2 in a region, this information may be used to determine a characteristic of the material 2. A phase value may also be referred to as a data value.

In use, the phase monitor 11 determines a first phase difference between the applied stimulation signal applied associated with the first and second electrode 5a, 5b and the received stimulation signal associated with the third and fourth electrodes 5c, 5d and generates a corresponding first phase value.

Additional phase values are then generated based on monitoring an electrical parameter different electrodes. For example, a second phase value may be generated by applying an applied stimulation signal to the first or second electrode 5a, 5b and monitoring an electrical parameter, and hence generating a received stimulation signal, for the fourth electrode 5d and a fifth electrode 5e. Hence, the second phase value indicates a phase difference between the applied stimulation signal associated with the first and second electrodes 5a, 5b and the received stimulation signal associated with the fourth and fifth electrodes 5d, 5e. This second phase value comprises a second data value associated with the material 2 in the pipe 3. This process can be repeated for each of the adjacent pairs of electrodes which are not energisation electrodes (i.e. 5d-5e, 5e-5f, . . . , 5o-5p). Where there are sixteen electrodes, as illustrated in FIG. 2, this results in thirteen phase values associated with an applied stimulation signal across the first and second electrodes 5a, 5b.

Once each of the pairs of monitor electrodes has been measured, as described above, the energisation configuration is switched such that a different pair of electrodes is the energisation electrodes. Additional phase values are then generated based on applying an applied stimulation signal to these different energisation electrodes. For example, additional phase values may be generated by applying an applied stimulation to one of the second or third electrodes 5b, 5c. A current is applied, by the current source 6, between the second and third electrodes 5b, 5c, as described above with reference to the first and second electrodes 5a, 5b, and the electrical potential is measured by the voltage monitor 7 at each of the thirteen adjacent pairs of monitor electrodes (5d-5e, 5e-5f, . . . , 5p-5a).

This process is repeated until all relevant combinations of energisation electrodes and monitored electrodes have been monitored, resulting in a series of data values. In this series of data values, each data value is indicative of a phase difference between the applied stimulation signal and a corresponding received stimulation signal. That is, the series of data values comprises a series of phase values. This series of data values defines a phase fingerprint. The phase fingerprint can be used to determine a characteristic of the material, for example using the controller, as described in more detail below. The use of a phase fingerprint to determine a characteristic of a material may be referred to as electrical impedance fingerprinting (EIF).

In the above described measurement apparatus 1, having sixteen electrodes 5, there are sixteen possible energisation electrode configurations, and thirteen monitor electrodes configurations for each of those sixteen energisation electrode configurations, resulting in two hundred and eight (208) unique measurement configurations. However, while two hundred and eight (208) unique measurement configurations exist, where a measurement configuration is a direct inverse of an earlier measurement configuration (e.g. where the energisation electrodes and monitored electrodes are simply reversed), the measurement configuration can be omitted. As such, one hundred and four (104) independent measurements may provide a series of data values from which a characteristic of the material 2 may be determined. That is, one hundred and four (104) independent measurements may be taken, resulting in the generation of a phase fingerprint comprising one hundred and four (104) data values indicative of a phase difference.

Rather than extracting only phase data (i.e. the imaginary portion of the electrical parameter), amplitude data (i.e. the real portion of the electrical parameter) may be extracted from the received stimulation signal. In such arrangements, the phase monitor 11 is alternatively or additionally configured to generate an amplitude value indicative of an amplitude of the received stimulation signal. The amplitude data can be extracted in addition to, or alternatively to, the phase data. That is, the monitored electrical parameter comprises both phase and amplitude components, but a choice can be made whether to utilise phase data only, amplitude data only, or both phase data and amplitude data. The phase monitor 11 may be referred to as a monitor.

The generation of amplitude data can be performed as described above for phase data, i.e. by energising different pairs of energisation electrodes and monitoring to generate a series of amplitude values. The series of amplitude values defines an amplitude fingerprint. The amplitude fingerprint can be used to determine a characteristic of the material, for example using the controller, as described in more detail below. The use of an amplitude fingerprint to determine a characteristic of a material may be referred to as electrical impedance fingerprinting (EIF). As is described in more detail below, the use of an amplitude fingerprint may be particularly useful in determining characteristics of a material related to the solid phase portion of a material, for example the composition and/or concentration of solids in a mixture.

Each of the phase fingerprint and amplitude fingerprint may be more simply referred to as an electromagnetic fingerprint.

FIGS. 3A and 3B shows examples of two phase fingerprints 30, 32 generated using a measurement apparatus 1 having sixteen electrodes 5 arranged as illustrated in FIGS. 1 and 2. Each phase fingerprint 30, 32 comprises one hundred and four (104) data values. FIG. 3A shows a first phase fingerprint 30 for a low admittivity material. FIG. 3B shows a second phase fingerprint 32 for a high admittivity material. In FIGS. 3A and 3B, the individual data values are not shown, but a line joining each data value to its preceding and following data value is shown. It can be seen that each phase fingerprint 30, 32 forms a pattern. That is, there is an interrelationship between the data values of each phase fingerprint 30, 32 which is somewhat distinct to that phase fingerprint 30, 32.

The pattern formed by each phase fingerprint 30, 32 may have a contribution from a variety of factors, for example characteristics of the material such as admittivity. The pattern formed by the first phase fingerprint 30 in FIG. 3A is significantly different in form to the pattern formed by the second phase fingerprint 32 in FIG. 3B. By considering the interrelationships between data values of a phase fingerprint 30, 32, for example using the controller 8, a characteristic of a material 2 may be determined. The interrelationships may be considered in a number of ways, as described in more detail below.

FIG. 4 shows an alternative sensor apparatus 4a for an alternative measurement system. The sensor apparatus 4a comprises a linear structure upon which electrodes 5a-5p may be affixed. The electrodes 5a-5p are arranged with a particular geometry along the sensor apparatus 4a. In sensor apparatus 4a shown in FIG. 4, the electrodes 5 are arranged linearly along the sensor apparatus 4a. This arrangement of electrodes may be referred to herein as a linear geometry. The sensor apparatus 4a may be separate from the other components of measurement system, although it may be in communication with the other components measurement system. The sensor apparatus 4a may hence be inserted into a pipe or vessel in order to characterise a material within the pipe or vessel and then removed.

Such a sensor apparatus 4a may also be introduced to and affixed permanently or semi-permanently to a pipe or vessel. This is beneficially utilised in order to retrofit electrodes into a pipe or vessel.

With a measurement apparatus comprising a linear geometry, the region of interest within which a characteristic may be determined is defined, in part, by the pipe or vessel within which the sensor apparatus 4a is inserted. The region of interest is also defined, in part, by the extent to which an electric field applied to one of the electrodes 5a-5p penetrates into the material in the pipe or vessel.

The sensor apparatus 4a also comprises means (not shown) for connecting the sensor apparatus 4a to an energisation source, stimulation monitor, phase monitor and controller. The sensor also has grounding electrodes G1, G2 capable of providing a zero-voltage reference level.

In operation, the sensor apparatus 4a depicted in FIG. 4 is similar to the sensor apparatus 4 depicted in FIGS. 1 and 2. That is, each of the electrodes 5a-5p is switchable connected to the energisation source and stimulation monitor. By repeatedly applying an applied stimulation signal to a first electrode, and measuring an electrical parameter at another one of the electrodes, a series of data values indicative of a phase difference between the applied stimulation signal and received stimulation signal may be generated, thereby forming a phase fingerprint. The phase fingerprint can be used to determine a characteristic of the material, for example using the controller, as described in more detail below. That is, a measurement apparatus using the sensor apparatus 4a as described with reference to FIG. 4, can be used for electrical impedance fingerprinting (EIF).

FIGS. 5A and 5B show examples of two phase fingerprints 50, 52 generated using a measurement apparatus having sixteen electrodes 5a-5p in a linear geometry as illustrated in FIG. 4. It is noted that, while each phase fingerprint 50, 52 comprises one hundred and four (104) data values, only the first fifty (50) values are shown in FIG. 4, in order to visualise the fingerprints 50, 52 more clearly. FIG. 5A shows a first phase fingerprint 50 for a low admittivity material. FIG. 5B shows a second phase fingerprint 52 or a high admittivity material. In FIGS. 5A and 5B, the individual data values are not shown, but a line joining each data value to its preceding and following data value is shown. It can be seen that each phase fingerprint 50, 52 forms a pattern. That is, there is an interrelationship between the data values of each phase fingerprint 50, 52 which is somewhat distinct to that phase fingerprint 50, 52.

It can be seen that the phase fingerprints 50, 52 generated using a measurement apparatus with a linear geometry forms a substantially different pattern to the phase fingerprints 30, 32 generated using a measurement apparatus with a circumferential geometry. The pattern formed by the phase fingerprints 50, 52, 30, 32 has a contribution from the geometry of the electrodes.

The pattern formed by the phase fingerprints 50, 52, 30, 32 may also have a contribution from the order in which stimulation signals are applied and received. In the above-described examples, an adjacent pair ordering is used, where adjacent pairs of electrodes are used for the application and receipt of stimulation signals. However, different orderings may be used, for example an opposite pair ordering, wherein the received stimulation signal may be associated with electrodes on opposite sides of the pipe. The pattern formed by phase fingerprints generated using the opposite pair ordering will likely be different to those generated using the adjacent pair ordering.

The pattern formed by each phase fingerprint 30, 32, 50, 52 may have a contribution from a variety of factors, for example characteristics of the material such as admittivity.

The pattern formed by the first phase fingerprint 50 in FIG. 5A is significantly different in form to the pattern formed by the second phase fingerprint 52 in FIG. 5B.

By considering the interrelationships between data values of a phase fingerprint 50, 52, for example using the controller 8, a characteristic of a material 2 may be determined. That is, EIF may be used to determine a characteristic of a material.

Similar trends are seen when viewing amplitude fingerprints—each amplitude fingerprint may have a contribution from a variety of factors, for example characteristics of the material such as admittance. By considering the interrelationships between data values of an amplitude fingerprint (or both an amplitude fingerprint and a phase fingerprint), a characteristic of a material may be determined.

In known methods of determining a characteristic of a material, for example using electrical impedance tomography (EIT), there is a requirement to identify a reference value associated with the material, for example the liquid phase conductivity of the material. As previously discussed, such a reference value may be inaccurate and/or difficult to acquire. By determining a characteristic of a material using EIF, the characteristic may be determined without the need for a reference value. Rather, EIF may determine the characteristic based on the pattern formed by the fingerprint, obviating the need for a reference value. As a result, EIF may provide a more accurate and/or more easily acquirable determination than previously known methods.

Furthermore, known methods of determining a characteristic of a material, for example EIT, are typically slow and/or computationally intensive. In particular, using EIT to calculate a global characteristic of the material (e.g. a characteristic of the entire region, for example an average conductivity of a mixture within a region), can be particularly slow and computationally intensive. In order to calculate such a global characteristic using EIT, a tomogram (i.e. a map) is generated, determining the conductivity of each of a plurality of sub-regions within the region. The conductivity of each sub-region is then averaged to calculate the average conductivity of the mixture. Such calculations may be time consuming. As a result, accurate real-time analysis may be difficult to acquire. Beneficially, by determining a characteristic of a material using the phase fingerprint of the material (i.e. using EIF), the characteristic may be determined relatively quickly. That is, the characteristic may be determined without the need for calculations (e.g. calculations of characteristics of sub-regions of the region) so may be quicker than previously known methods.

In known methods of performing EIT, calculations are performed upon acquired data in order to calculate the conductivity of sub-regions. Such calculations require pre-existing knowledge of the physical principles which affect the acquired data. The equations may be based upon mathematical models, theoretical models or simulations. The calculations typically use many approximations of the behaviour of materials when electrical stimulation is applied. Identifying the interrelationship between data values of an electromagnetic fingerprint, for example using a trained machine learning model, is not equivalent to known methods of performing calculations with the data values. Identifying the interrelationship in an electromagnetic fingerprint does not necessarily require any knowledge of the underlying physical principles, nor does it make any assumptions regarding the data. Rather, the interrelationship is identified simply as a pattern between data values, which, it has surprisingly been found, can be used to determine a characteristic without the need for the types of calculations previously used.

Figure 6:
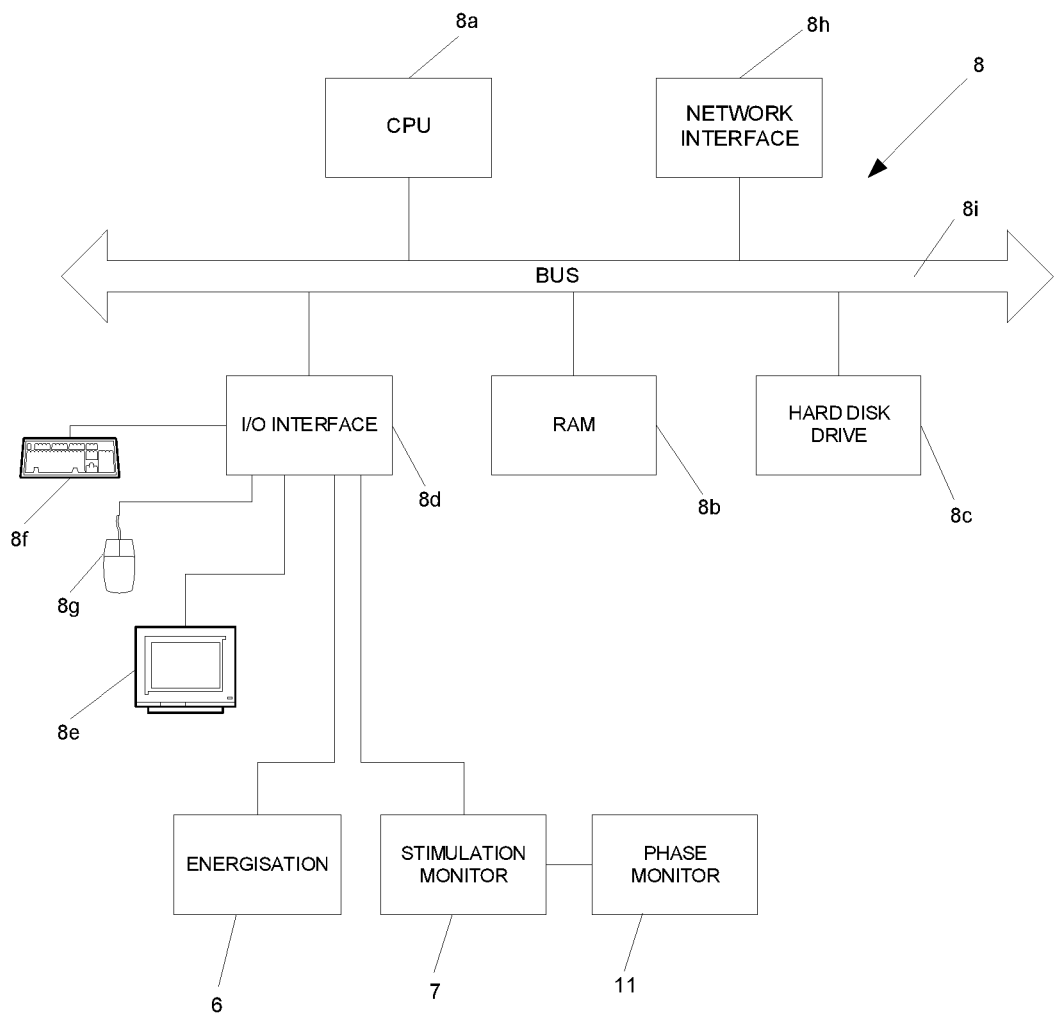
FIG. 6 shows a part of the measurement system shown in FIG. 1 in more detail.

FIG. 6 shows the controller 8 in further detail. It can be seen that the controller 8 comprises a CPU 8a which is configured to read and execute instructions stored in a volatile memory 8b which takes the form of a random access memory. The volatile memory 8b stores instructions for execution by the CPU 8a and data used by those instructions. For example, in use, measured potential difference values may be stored in the volatile memory 8b. The controller 8 further comprises non-volatile storage in the form of a solid state drive 8c. The measured potential difference values may be stored on the solid state drive 8c.

The controller 8 further comprises an I/O interface 8d to which are connected peripheral devices used in connection with operation of the controller, and with obtaining the phase values. More particularly, a display 8e is configured so as to display output from the controller 8. The display 8e may, for example, display a representation of the generated phase values, or a graphical user interface. Additionally, the display 8e may display images generated by processing of the phase values. Input devices are also connected to the I/O interface 8d. Such input devices include a keyboard 8f and a mouse 8g which allow user interaction with the controller 8. The energisation source 6 and stimulation monitor 7 are also connected to the I/O interface 8d, allowing the controller 8 to control the energisation source 6 and the stimulation monitor 7. The phase monitor 11 is arranged such that it is capable of receiving the received stimulation signals from the stimulation monitor 7.

A network interface 8h allows the controller 8 to be connected to an appropriate computer network so as to receive and transmit data from and to other computing devices. For example, the controller 8 may be remotely controlled by a remote computer via the Internet. The CPU 8a, volatile memory 8b, solid state drive 8c, I/O interface 8d, and network interface 8h, are connected together by a bus 8i.

Figure 7:
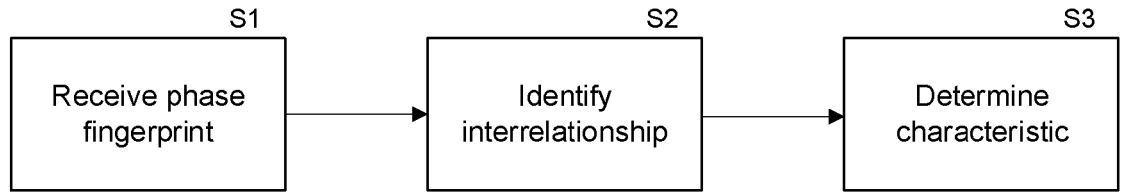
FIG. 7 shows a process carried out by the measurement system shown in FIG. 1.

FIG. 7 shows a process running on the controller 8 to determine a characteristic of a material. At step S1, the controller 8 receives a phase fingerprint. The phase fingerprint is defined by a series of data values as described above, the series of data values corresponding to phase values for the material in a region of interest. At step S2, the controller identifies an interrelationship between at least some of the data values of the phase fingerprint. At a step S3, the controller determines the characteristic of the material based on the identified interrelationship.

In a specific example, the controller further comprises a machine learning model. By training the machine learning model, it can be trained to recognise features of the phase fingerprint. The machine learning model can be trained using supervised learning, for example by providing the model with phase fingerprints of known materials for which one or more characteristics are known. As such, the machine learning model can identify interrelationships between data values of the phase fingerprints and associate these with specific characteristics. Subsequently, when a new phase fingerprint associated with an unknown material is provided to the trained machine learning model, the model may identify an interrelationship between features of the new phase fingerprint and associate this interrelationship with a specific characteristic. In this example, the identification of an interrelationship is indirect in that the machine learning model receives a phase fingerprint as an input and provides data indicating the characteristic, without outputting information regarding the interrelationship. That is, the identification of an interrelationship is an internal process of the machine learning model.

The model may comprise weights and/or biases. The weights and/or biases may be initialised initially. The weights and/or biases may be selected during training, for example based on the interrelationships identified by the model during training. Weights and/or biases may be considered representative of the interrelationships identified by the model during training. After training, weights and biases of the model may be referred to as trained parameters. That is, training the model generates trained parameters. Subsequently, when a new phase fingerprint associated with an unknown material is provided to the trained machine learning model, the model may identify an interrelationship between features of the new phase fingerprint and associate this interrelationship with a specific characteristic using its trained parameters.

A range of different machine learning algorithms may be used, for example neural networks, regression, decision trees and nearest neighbour to name a few. The algorithm used can be selected depending on the requirements of the user, for example whether classification and/or regression analysis is desired, and/or the user's available processing power.

A support vector machine can also be used for the machine learning model. A support vector machine may be particularly beneficial when used for classification-type problems.

Beneficially, providing phase fingerprints as inputs to a machine learning model allows the identification of interrelationships (i.e. the relationship between data values of a phase fingerprint) that would otherwise not be accessible by typical means. Beneficially, providing phase fingerprints as inputs to a machine learning model allows the determination of characteristics based on interrelationships (i.e. the identification of particular characteristics based on particular interrelationships in a fingerprint) that would otherwise not be accessible by typical means. That is, using a trained machine learning model to determine a characteristic of a material within a region may provide for more accurate and/or detailed characterisation.

Figure 8A:
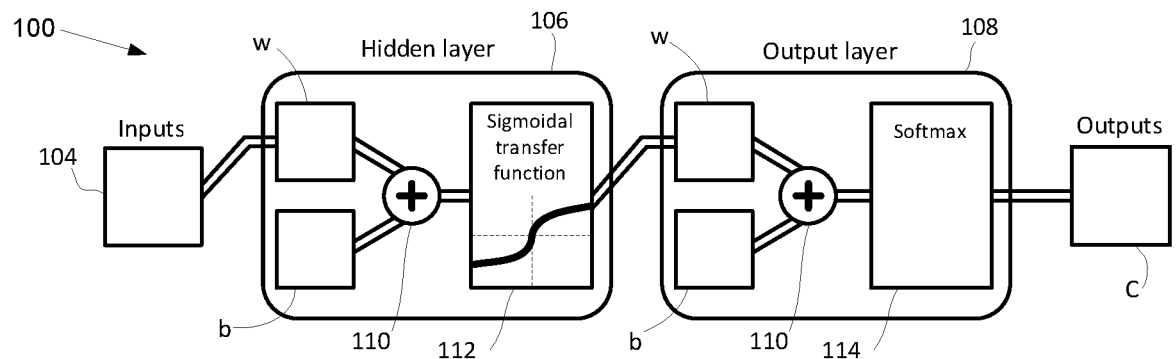
FIGS. 8A and 8B show example machine learning models which are part of the measurement system shown in FIG. 1 according to an example arrangement.
Figure 8B:
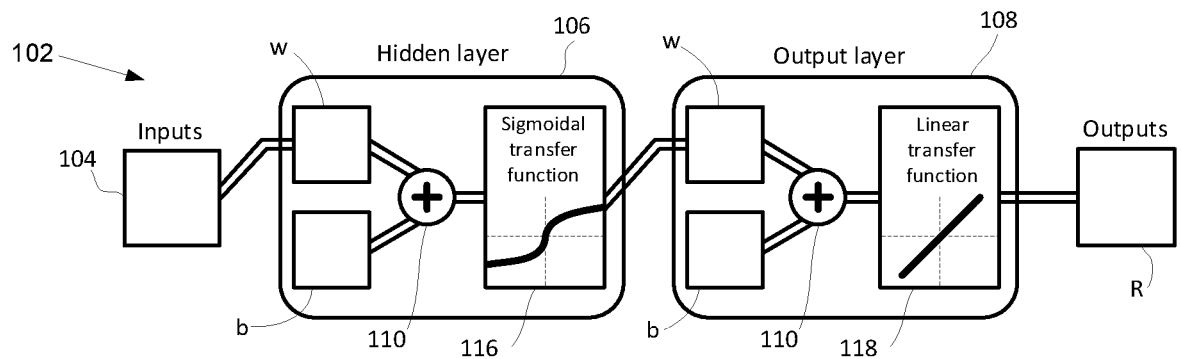

FIGS. 8A and 8B schematically illustrate two example machine learning models 100, 102 which can be used to identify a characteristic of a material. Each model 100, 102 comprises a two-layer, feedforward neural network. Each model 100, 102 is configured to receive a phase fingerprint as an input 104 to the model and feed this input 104 to a hidden layer 106. The hidden layer 106 comprises weights w and biases b (i.e. trained parameters) which are determined during a training phase. The hidden layer 106 acts on the input 104 and provides an intermediate output to an output layer 108. In particular, the weights w act upon the input to generate a first output. The first output is combined with the biases b, in a combining element 110, to form a second output. The second output is provided to a hidden layer output function 112, 116, thereby creating the intermediate output. The intermediate output is provided to the output layer 108.

The output layer 108 comprises weights w and biases b which are determined during the training phase. The output layer 108 acts on the intermediate output and provides a final output C, R which indicates the characteristic. In particular, the weights w act upon the intermediate output to generate a third output. The third output is combined with the biases b, in a combining element 110, to form a fourth output. The fourth output is provided to an output layer output function 114, 118, thereby creating the final output C, R. The final output C, R comprises data indicating the characteristic of the material.

In FIG. 8A, the model 100 is configured to solve classification problems, and may be referred to herein as a classification model 100. The final output C of the classification model comprises a classification. The hidden layer output function 112 comprises a sigmoidal transfer function. The output layer output function 114 comprises a softmax function.

In FIG. 8B, the model 102 is configured to solve regression problems, and may be referred to as a regression model 102. The final output R of the regression model 102 comprises a value of the characteristic or indicating the characteristic. The hidden layer output function 116 comprises a sigmoidal transfer function. The output layer output function 118 comprises a linear transfer function.

It should be understood that the architecture in FIGS. 8A and 8B is illustrative and may be arranged differently. For example, different output functions may be used, for example a classification model 100 may use a different output layer output function 114 configured to output a classification. The combining element 110 is illustrated as a separate block, but it may instead form part of another block. For example, the hidden layer output function 112, 116 may receive both the first input and one or more biases as separate inputs and combine them as part of the output function.

Below, example uses of the classification model 100 and the regression model 102 are described. These example uses are illustrative and should not be viewed as limiting. That is, EIF with machine learning can be used for a variety of material characterisation processes, some of which are described below.

Throughout the examples below, phase fingerprints, for example generated as described above, are provided as an input to the machine learning model 100, 102. The phase fingerprint data can be provided unprocessed. Alternatively, the data can be processed prior to input. For example, the phase fingerprints may be normalised prior to input. An example of data normalisation is described in more detail below with reference to characterising conductivity in hydraulic conveying systems. However, it should be understood that the characterisation of conductivity in hydraulic conveying systems may be performed with normalised or non-normalised data. It should also be understood that normalised data may be used in other applications, for example characterising formulations or monitoring clean-in-place processes.

Personal and home care products typically contain liquid surfactants such as sodium lauryl ether sulphate (SLES). These liquid surfactants self-assemble into different structures depending, in part, upon their interaction with electrolytes. Such surfactant assemblies give rise to drastic changes in many physical properties including: self-diffusion, surface tension, solubilisation and both shear and viscoelastic rheological properties. EIF can be utilised to identify the electrolyte concentration of a formulation. This can then be utilised to infer key structural properties of the formulation, for example to act as a quality or control tool for process optimisation.

The use of the machine learning models 100, 102 for the characterisation of electrolyte concentration of formulations is described below and with reference to FIGS. 9-11. In particular, the use of the machine learning models 100, 102 are described with reference to a particular example use. In this example, a measurement apparatus is used to collect phase fingerprints associated with a range of formulations. The measurement apparatus has a particular geometry, for example a circumferential geometry. Each formulation comprises an aqueous-based fluid, a liquid surfactant, and a salt. Each formulation has a salt concentration.

It is an aim of the example to train the machine learning models 100, 102 using a first subset of the phase fingerprints. The first subset of the phase fingerprints are associated with formulations for which the salt concentration is known, which are referred to as known formulations. The first subset of the phase fingerprints are referred to as known phase fingerprints, or training phase fingerprints.

It should be noted that, in this example implementation, the models 100, 102, are being trained using supervised learning. It should be understood that unsupervised training may also be used. In such an instance, the first subset of the phase fingerprints may be associated with formulations for which the salt concentration is unknown but which are provided as training data. Such a subset of phase fingerprints (for which the salt concentration is unknown but which are provided as training data) may also be referred to herein as known phase fingerprints, or training phase fingerprints. A clustering technique, e.g. k-means clustering, may be used to train the models 100, 102 in an unsupervised manner.

Returning to the current example implementation, it is an aim of the example to determine the salt concentration of a second subset of the phase fingerprints. In general use, the second subset of the phase fingerprints are associated with formulations for which the salt concentration is unknown, which are referred to as unknown formulations or new formulations. The second subset of the phase fingerprints are referred to as unknown phase fingerprints.

In this example use, the models 100, 102 are trained using a set of training data comprising known phase fingerprints. In particular, seven thousand seven hundred (7700) known phase fingerprints are provided to the models 100, 102 as training data. By providing a model 100, 102 with known phase fingerprints, the model may 'learn' the interrelationships between data values of the known phase fingerprints, and update its weights to represent these learned interrelationships.

Figure 9A:
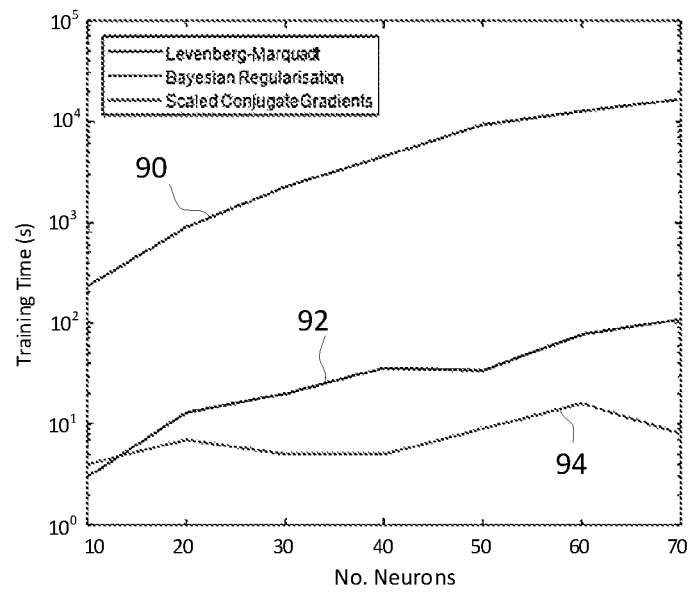
FIGS. 9A and 9B show data indicative of the performance of the models shown in FIGS. 8A and 8B.

A number of training algorithms may be used to optimise the training phase, for example Levenberg-Marquadt, scaled conjugate gradients or Bayesian regularisation. FIG. 9A depicts the training time for a range of example regression models, each using Bayesian regularisation 90, Levenberg-Marquadt 92 or scaled conjugate gradient 94 training algorithms. Each regression model has a structure as described above in reference to FIG. 8B. Each model has a different number of neurons, with numbers of neurons in the range ten to seventy being tested.

The scaled conjugate gradient 94 and Levenberg-Marquadt 92 algorithms provide a relatively low training time. Furthermore, the scaled conjugate gradient 94 algorithm provides consistent training times regardless of the number of neurons used. The Levenberg-Marquadt 92 algorithm provides a comparable training time to the scaled conjugate gradient 94 algorithm at low neuron numbers (e.g. ten) and the training time increases with neuron number.

Figure 9B:
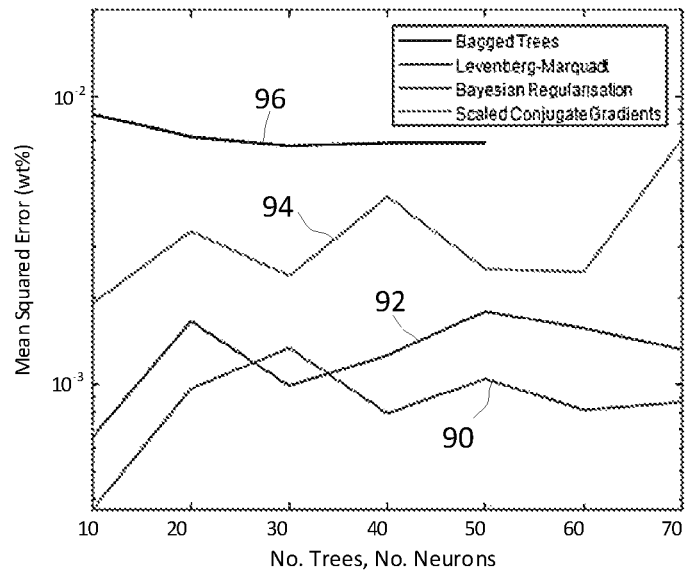

FIG. 9B illustrates the performance of said example regression models when characterising the salt concentration of unknown formulations associated with one thousand six hundred and fifty (1650) unknown phase fingerprints. In this instance, the salt concentration of the unknown formulations was determined using alternative means, for the purpose of measuring the performance of the regression models. FIG. 9B shows the mean squared error for the example regression models each using Bayesian regularisation 90, Levenberg-Marquadt 92 or scaled conjugate gradient 94 training algorithms. As above, each model has a different number of neurons, with numbers of neurons in the range ten to seventy being tested.

The Bayesian regularisation 90 and Levenberg-Marquadt 92 algorithms exhibit the lowest error rates, with relatively low error rates for any number of neurons in the range ten to seventy. The scaled conjugate gradient 94 algorithm exhibits a higher error rate than Bayesian regularisation 90 and Levenberg-Marquadt 92 algorithms in this example. For completeness, a bagged trees 96 algorithm is tested in the range of ten to fifty trees. However, the bagged trees 96 algorithm exhibits a higher error rate than the Bayesian regularisation 90, Levenberg-Marquadt 92 or scaled conjugate gradient 94 training algorithms.

There is typically a trade-off between training time and error rate. That is, a reduced error rate may typically correspond to an increased training time. For example, the Bayesian regularisation 90 algorithm provides the lowest error rate but highest training time. Furthermore, an increased number of neurons typically increases training time but reduces the error rate.

In this example, a neuron number of forty is chosen for the regression model 102. In this example, the Levenberg-Marquadt 92 algorithm is chosen for the regression model 102. Forty neurons and the Levenberg-Marquadt 92 algorithm for the regression model 102 in this example provides an acceptable training time and error rate. Other numbers of neurons and/or algorithms may be chosen depending on acceptable training times and/or error rates for a particular application.

A similar process is followed to determine the optimum number of neurons and the training algorithm for the classification model 100. In this example, the scaled conjugate gradient algorithm 94 is chosen for the classification model 100. In this example, a neuron number of forty is chosen for the classification model 100. Forty neurons and the scaled conjugate gradient algorithm for the classification model 100 in this example provides an acceptable training time and error rate. Other numbers of neurons and/or algorithms may be chosen depending on acceptable training times and/or error rates for a particular application.

The accuracy of the models 100, 102 can be further improved by performing a validation in addition to the training phase. The validation includes providing additional known phase fingerprints, i.e. known phase fingerprints that were not used in the training phase, to the model. The validation may be used to check that overfitting does not occur and/or that a global minimum is reached. A number of known phase fingerprints, for example one thousand six hundred and fifty (1650) known phase fingerprints, may be used for validation.

After training, and optionally validation, the models 100, 102 can be used for determining the electrolyte concentration of formulations with unknown electrolyte concentrations. In the examples, the concentration of a salt (a type of electrolyte) in formulations is determined.

Figure 10A:
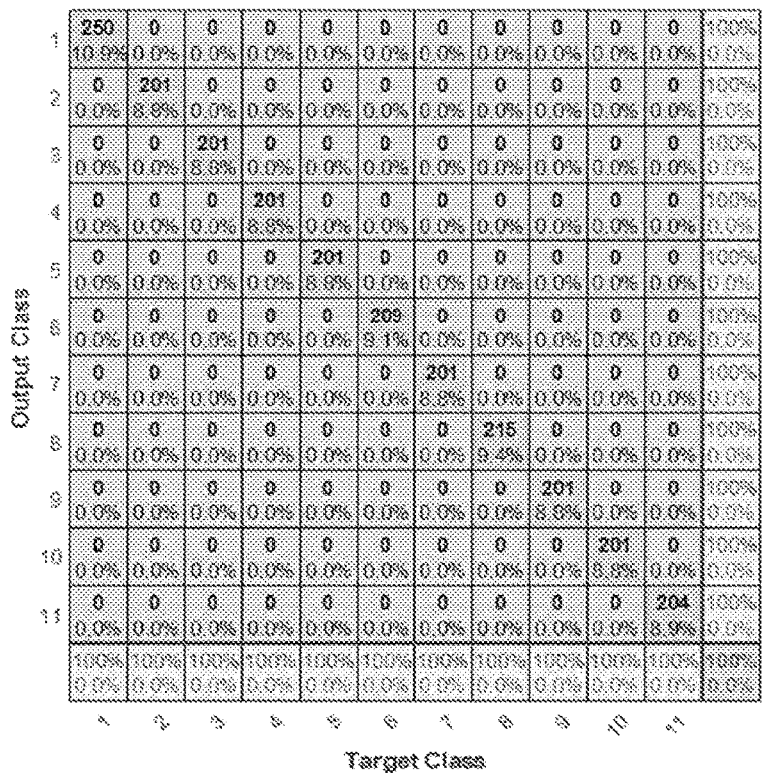
FIGS. 10A and 10B show data processed by the measurement system in FIG. 1.
Figure 10B:
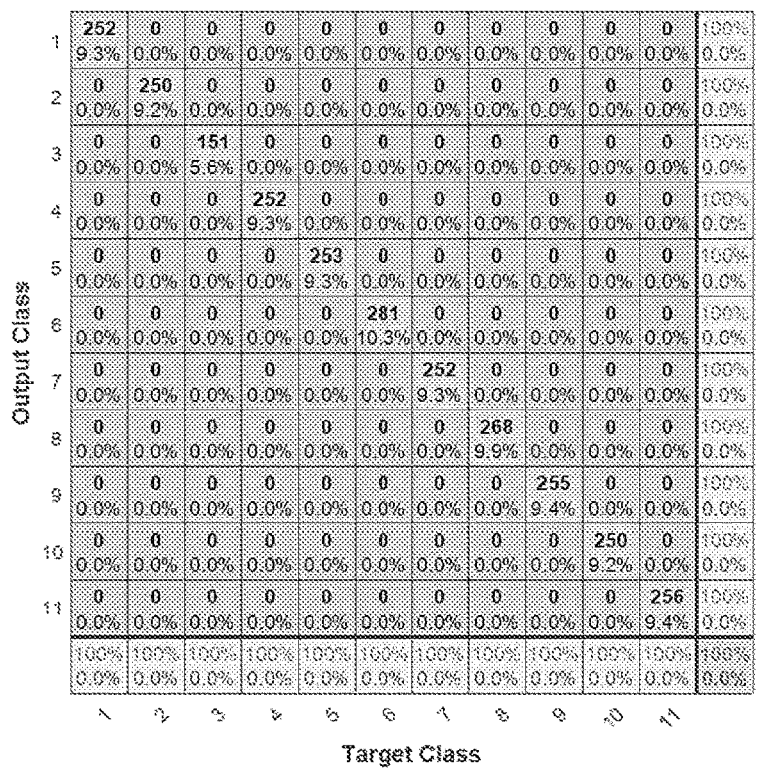

FIGS. 10A and 10B show confusion matrices representing the performance of classification tasks using a classification model 100. FIG. 10A refers to a first classification task performed using a measurement apparatus comprising a circumferential geometry. The formulation in this first classification task is being transported in a pipe upon which the measurement apparatus is located. As such, the classification model 100 in the first classification task is trained using known phase fingerprints associated with a measurement apparatus with a circumferential geometry. FIG. 10B refers to a second classification task performed using a measurement apparatus comprising a linear geometry. The formulation in this second classification task is housed in a vessel into which the linear geometry of electrodes may be inserted. As such, the classification model 100 in the second classification task is trained using known phase fingerprints associated with a measurement apparatus with a linear geometry. In each classification task, a series of classes are defined, each class representing a salt concentration value. For example, a first target class represents a salt concentration of approximately 0% of the formulation by weight (wt %) and a sixth target class represents a salt concentration of approximately 5 wt %. Any number of classes can be used. In another example implementation, a class may represent a range of concentration values, for example salt concentration in the range 4.5 wt % to 5.5 wt %.

To classify a new formulation, a phase fingerprint is generated for the new formulation and provided as an input to the classification model 100. The phase fingerprint is classified, by the classification model 100, into one of eleven output classes, each output class representing one of the series of classes. The output class is provided to the controller. The output class indicates a range of salt concentrations, and so the controller can return the determined salt concentration as within this range of salt concentrations. For example, if the classification model 100 returns the first target class as an output class for the new formulation, the controller returns the determination that the salt concentration of the new formulation is approximately 0% of the formulation by weight (wt %) and the sixth target class represents a salt concentration of approximately 5 wt %. Any number of classes can be used. In another example implementation, a class may represent a range of concentration values, for example salt concentration in the range 4.5 wt % to 5.5 wt %.

To produce the confusion matrices shown in FIGS. 10A and 10B, the actual salt concentration of each new formulation is measured or received for comparison. Each new formulation and associated phase fingerprint is assigned a target class in which its actual salt concentration falls. It can be seen in FIGS. 10A and 10B that the classification model 100 correctly classifies each phase fingerprint into the same output class as its target class i.e. the classification is correct, using both the measurement apparatus with a circumferential geometry and for the measurement apparatus with a linear geometry.

Figure 11A:
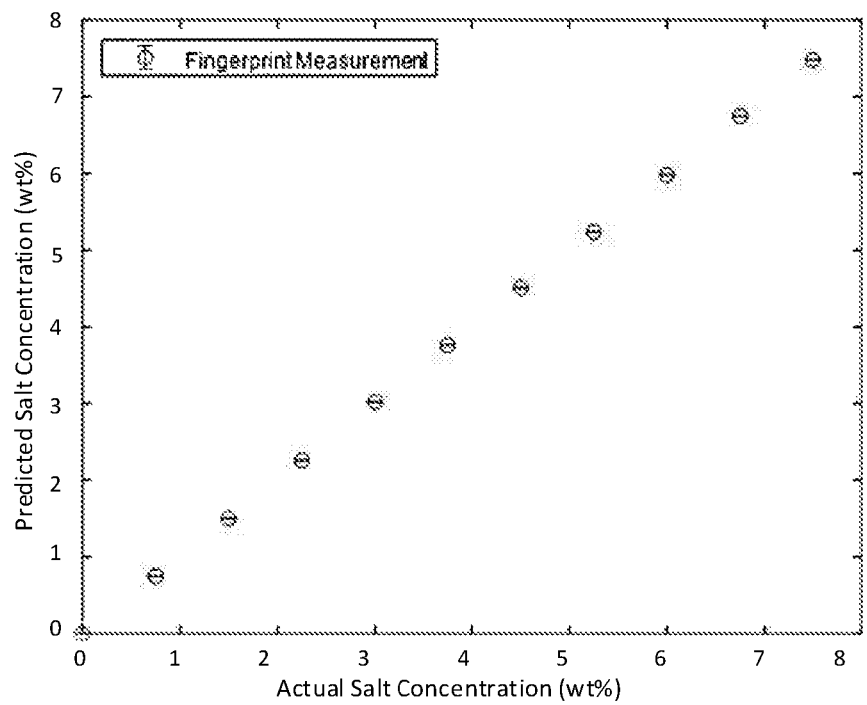
FIGS. 11A and 11B show data processed by the measurement system in FIG. 1.
Figure 11B:
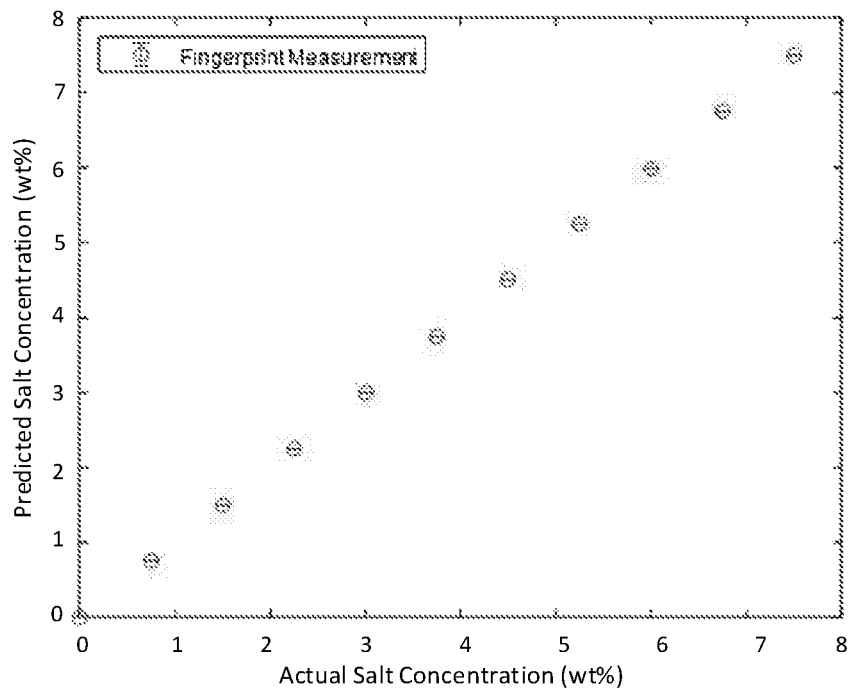

FIGS. 11A and 11B show results representing the performance of regression tasks using regression model 102. FIG. 11A refers to a first regression task performed using a measurement apparatus comprising a circumferential geometry. The formulation in this first regression task is being transported in a pipe upon which the measurement apparatus is located. As such, the regression model 102 in the first regression task is trained using known phase fingerprints associated with a measurement apparatus with a circumferential geometry. FIG. 10B refers to a second regression task performed using a measurement apparatus comprising a linear geometry. The formulation in this second regression task is housed in a vessel into which the linear geometry of electrodes may be inserted. As such, the regression model 102 in the second regression task is trained using known phase fingerprints associated with a measurement apparatus with a linear geometry.

To perform a regression task on a new formulation, a phase fingerprint is generated for the new formulation and provided as an input to the regression model 102. The regression model 102 provides to the controller, as an output, a value indicating the predicted salt concentration for that formulation. For example, the controller may determine, based on the data received as an output of the regression model 102, that the formulation has a predicted salt concentration of 2.2 wt %.

To produce the performance graphs shown in FIGS. 11A and 11B, the actual salt concentration of each new formulation is measured or received for comparison. The actual salt concentration is plotted against the predicted salt concentration. It can be seen in FIGS. 11A and 11B that the regression model 102 predicts the correct salt concentration for all new formulations tested, using both the measurement apparatus with a circumferential geometry and for the measurement apparatus with a linear geometry. The accuracy of the regression task using the regression model 102 is high, with a root mean squared error of 0.026 wt % and 0.018 wt % for the circumferential geometry and the linear geometry, respectively.

The applicant has found that using EIF with a machine learning model, such as the models 100, 102 described above, is applicable to a range of regression and characterisation tasks. For example, determination of the electrolyte concentration of forty-four different types of SLES formulation has been demonstrated using these models 100, 102. When determining a classification for the electrolyte concentration of said SLES formulations, the determination has an average misclassification rate of 0.31%.

Other characteristics of materials can be determined using EIF with a machine learning model. For example, the concentration of a substance other than an electrolyte in a solution may be determined and/or the pH of a material may be determined using EIF with a machine learning model. In one example, the concentration of xanthan gum in an aqueous fluid is determined. In another example, the pH of a mixture of Carbopol and sodium hydroxide is determined using EIF with a machine learning model.

In the examples described above and with reference to FIGS. 9 to 11, phase fingerprints for the formulations are measured while in a pipe e.g. while the formulations are in transit. However, the use of EIF with a machine learning model for determining a characteristic of a material is applicable to both materials flowing within a pipe and to material in a vessel.

The use of formulation characterisation in a mixed or unmixed vessel may be beneficial for the optimisation of mixing performance. The use of material characterisation in a mixed or unmixed vessel may also be beneficial for the identification of process end points which may be indicated by, for example, a change in a characteristic of a formulation. Beneficially, due to the high speed of characterisation using EIF with a machine learning model, characterisation may be performed in real-time, providing real-time process information.

Furthermore, in the example above, the formulations are homogeneous (i.e. mixed). However, EIF may also be used to characterise inhomogeneous (i.e. unmixed) formulations. For example, the formulation may be characterised while in an unmixed vessel. Additionally, the formulation may be characterised while in transit in an inhomogeneous state, for example in a flow regime with a bed flow.

Hydraulic conveying systems may be used to convey mixtures, for example through pipes. A typical mixture comprises water, large particles of solid matter (referred to as solid inclusions) and small particles of solid matter. An example of a solid inclusion is sand. An example of a small particle of solid matter is kaolin. Kaolin is a type of clay with a generally small particle size. For the purposes of the following discussions, Kaolin is not considered to be a solid inclusion (despite being a solid). This is due to the different way in which small particles such as kaolin interact with an electric field propagating through a mixture. Small particles such as kaolin effect a phase change on a propagating electric field (i.e. they affect the imaginary component of complex impedance). Large particles, on the other hand, generally effect a change in amplitude on a propagating electric field (i.e. they affect the real component of complex impedance).

As previously mentioned, some measurement techniques used for the characterisation of mixtures in hydraulic conveying systems (e.g. EIT) typically require a liquid phase conductivity value as a reference value. The liquid phase conductivity value quantifies the conductivity of the liquid material in the mixture. In conventional systems, however, the liquid phase conductivity is difficult to measure accurately. For example and as described above, EIT may require the liquid phase conductivity to be tested at a remote location, which may be inaccurate, or through analysis of sub-regions of a tomogram, which may be computationally intensive and/or slow. This is, in part, because EIT is largely sensitive to the presence large particles in a mixture and hence cannot determine a liquid phase conductivity value of a mixture in-situ without additional reference information.

EIF, on the other hand, is largely insensitive to the presence of solids, particularly when used to monitor flows of disperse mixtures. While the presence of solid inclusions and/or small particles may affect the magnitude of a phase fingerprint for a disperse mixture, the shape of the phase fingerprint will remain generally unchanged. That is, the phase fingerprint is generally responsive to the conductivity of the mixture and generally unresponsive to the presence of solid inclusions and/or small particles in the mixture. Therefore, EIF provides an effective means of determining the conductivity of liquid phase material in a mixture.

It should be noted that, in other example implementations (e.g. other than flows of disperse mixtures), the conductivity may be responsive to one or more of: temperature, solid concentration, chemical reaction status, process status. In such instances, EIF may be used to determine the conductivity of liquid phase material in a mixture using an amended version of the methods described in this section.

FIG. 12A shows non-normalised phase fingerprints and FIG. 12B shows normalised phase fingerprints, collected for two disperse mixtures. The first mixture, represented by a first phase fingerprint 120, substantially consists of water. The second material, represented by a second phase fingerprint 122, comprises a mixture of water and kaolin with a kaolin concentration of 15% by weight (wt %). The phase fingerprints 120, 122 are generated using a measurement system comprising a circumferential geometry.

It can be seen in FIG. 12A that the presence of kaolin in the mixture affects the propagation of an electric field through a mixture such that the magnitude of a phase difference data value in the first phase fingerprint 120 is different to a corresponding phase difference data value in the second phase fingerprint 122. However, it can be seen in FIG. 12B that, once normalised, the phase fingerprints 120, 122 appear substantially identical. That is, the interrelationships between data values of the first phase fingerprint 120 are substantially equivalent to interrelationships between data values of the second phase fingerprint 122. As such, the phase fingerprints (and hence EIF) is insensitive to the presence of small particles such as kaolin.

Beneficially, the insensitivity of EIF to both small and large solid particles when determining the liquid phase conductivity allows a global parameter to be determined for a material in a region, regardless of specific other properties of the material in the region.

FIG. 13 illustrates the insensitivity of EIF to the presence of solid inclusions. In this illustrative example, phase fingerprints are generated for a set of mixtures. The mixtures comprise water, kaolin and, optionally, solid inclusions. Each mixture has a known kaolin concentration within the range 0% to 20% kaolin by weight (wt %). A first subset of the set of mixtures has solid inclusions, and a second subset has no solid inclusions. The mixtures are conveyed in a pipe. Phase fingerprints are generated using a measurement system as described with reference to FIGS. 1 and 2 with a circumferential geometry of sensors.

FIG. 13 shows phase fingerprints for a series of mixtures. Each series of data points relates to mixtures with a specific kaolin concentration (i.e. 5 wt %, 10 wt %, 15 wt % or 20 wt %). Each series of data points plots the normalised amplitude of a first phase fingerprint generated for a mixture comprising solid inclusions against the normalised amplitude of a second phase fingerprint generated for a mixture, of comparable kaolin concentration, comprising no solid inclusions. Each series can be fitted by a unitary fitting line, indicating that the phase fingerprints are independent of the presence of both kaolin and solid inclusions. That is, the interrelationships between data values of phase fingerprints of mixtures with and without solid inclusions, and for different kaolin concentrations, are substantially equivalent. Hence, EIF can be used to determine properties of the liquid phase of the mixture, independent of any large or small particles of solid within the mixture. That is, EIF can be used to determine the liquid phase conductivity of a mixture in-situ.

In an illustrative example, EIF is used with a regression model 102 (as described above with reference to FIG. 8B) to determine the liquid phase conductivity of a series of mixtures. Each mixture comprises an aqueous liquid, solid inclusions in the range 0% to 28% solids by volume (vol %), and optionally small particles of solid matter (e.g. kaolin). The aqueous liquid in each mixture has a conductivity in the range 0 mS/cm to 35 mS/cm (i.e. the liquid phase conductivity of each mixture is in the range 0 mS/cm to 35 mS/cm). Phase fingerprints are generated for the mixtures as they are conveyed in a pipe. A measurement apparatus comprising a circumferential geometry of sensors within the pipe is used. In this example implementation of EIF, the conductivity of the aqueous liquid is independent of the concentration of solid inclusions.

Firstly, the regression model 102 is trained using a set of phase fingerprints associated with mixtures of known conductivities. The mixtures of known conductivities may be referred to as known mixtures. The known mixtures each have a known liquid phase conductivity in the range 0 mS/cm to 35 mS/cm and a known concentration of solid inclusions in the range 0% to 28% solids by volume (vol %).

After training, the regression model 102 is used to determine the liquid phase conductivity of a set of mixtures with unknown conductivities. The mixtures of unknown conductivities may be referred to as unknown mixtures. The unknown mixtures each have an unknown liquid phase conductivity in the range 0 mS/cm to 35 mS/cm and an unknown concentration of solid inclusions in the range 0% to 28% solids by volume (vol %). A phase fingerprint is generated for each unknown mixture, and is provided as an input to the regression model 102. The regression model 102 provides to the controller, as an output, a value indicating the liquid phase conductivity of each unknown mixture.

Figure 14:
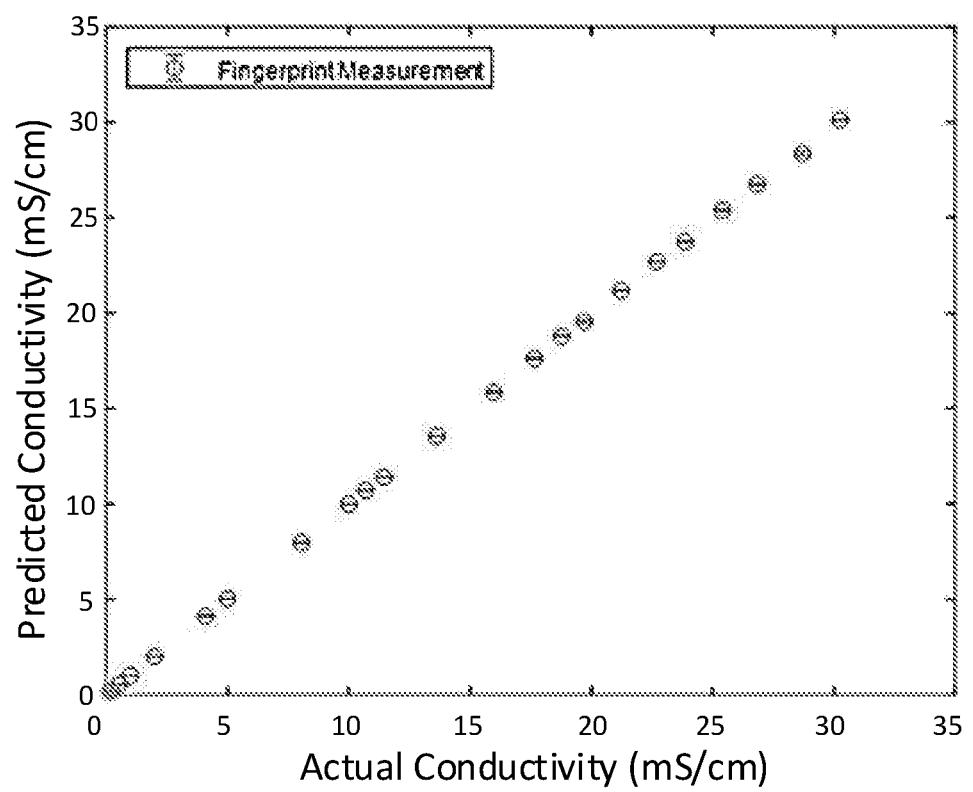
FIG. 14 shows data processed by the measurement system in FIG. 1.

To assess the performance of the regression model 102 for determining the liquid phase conductivity of mixtures, the actual liquid phase conductivity of each unknown mixture is measured and compared to the liquid phase conductivity predicted by the model 102. FIG. 14 depicts the predicted liquid phase conductivity plotted against the actual liquid phase conductivity for a range of unknown mixtures. It can be seen that the regression model 102 accurately predicts the correct liquid phase conductivity. The root mean squared error is 0.055 mS/cm, demonstrating a highly accurate prediction rate.

Furthermore, the regression model 102 accurately predicts the correct liquid phase conductivity for each unknown mixture despite the fact that the solid inclusion concentration differs for each mixture. That is, EIF may be used to determine liquid phase conductivity regardless of the solid inclusion concentration. Whereas in other measurement systems (e.g. EIT) it is difficult (for example, computationally intensive and/or inaccurate) to separate the liquid phase conductivity and solid inclusion concentration and thereby determine the liquid phase conductivity of a mixture in situ, EIF allows for the separation of conductivity and solid inclusion concentration, thereby providing a means of determining liquid phase conductivity in situ.

The time taken for the regression model 102 to output a value indicative the liquid phase conductivity given a phase fingerprint for an unknown mixture is very short compared to the time taken to calculate a conductivity value using previously used methods, for example based on sub-regions of a tomogram or additional electrode measurements. For example, the time taken for the regression model 102 to output a value may be 300-1000 ms faster than using previous methods. Furthermore, the use of the regression model 102 process is less computationally intensive compared to previously used methods.

Given the high speed of characterisation using EIF with a machine learning model, characterisation of the liquid phase conductivity of mixtures may be performed in real-time. For example, the liquid phase conductivity of a mixture may be periodically determined for material in transit through a hydraulic conveying system.

Furthermore, using EIF with a machine learning model provides a method of characterisation of the liquid phase conductivity of mixtures without requiring any additional instrumentation e.g. a conductivity probe. That is, EIF can be used alongside EIT, with EIF providing the liquid phase conductivity as a reference value to the EIT process. As such, EIF may be used to improve the accuracy and/or speed of EIT.

It is noted that normalised or non-normalised phase fingerprints may be provided as an input to the machine learning models 100, 102. Beneficially, by normalising phase fingerprint data, the characteristic of a material can be determined more accurately.

For example, the liquid phase conductivity of water and water comprising 15 wt % kaolin (as illustrated by the phase fingerprints 120, 122 in FIGS. 12A and 12B), is determined using the regression model 102. Using both normalised and non-normalised data, the liquid phase conductivity is determined to be 0.15 mS/cm. This indicates that both normalised and non-normalised data may be used to determine the conductivity correctly. However, the use of normalised data yields an error of 0.0024 mS/cm, compared to 0.0062 mS/cm using non-normalised data. As such, the use of normalised data may provide a more accurate determination. In other use cases, an improvement in accuracy of between 2 to 3 times may be yielded by using normalised phase fingerprint data compared to non-normalised data.

In hydraulic conveying systems, measurement techniques are typically performed when the pipe is oriented vertically. However, horizontal conveying is also sometimes required, so measurement on pipes oriented horizontally may be beneficial. FIG. 15A depicts a pipe 3 in vertical orientation 140 and horizontal orientation 142. In vertical orientation 140, material within the pipe 3 flows generally vertically. In vertical orientation 140, the material is typically a homogeneous mixture 2A. In horizontal orientation 142, material within the pipe 3 flows generally horizontally. In horizontal orientation 142, the material typically comprises a liquid phase portion 2B and a bed flow 2C which comprises solid phase material.

FIG. 15B depicts a vertical phase fingerprint 144 associated with a pipe 3 in vertical orientation 140 and a horizontal phase fingerprint 146 associated with a pipe 3 in horizontal orientation. In the phase fingerprints 144, 146 in FIG. 15B, the individual data values are not shown, but a line joining each data value to its preceding and following data value is shown. It can be seen that each phase fingerprint 144, 146 forms a pattern. That is, there is an interrelationship between the data values of each phase fingerprint 144, 146 which is somewhat distinct to that phase fingerprint 144, 146.

The pattern formed by each phase fingerprint 144, 146 may have a contribution from a variety of factors, for example characteristics of the material such as flow regime. The pattern formed by the vertical phase fingerprint 144 is significantly different in form to the pattern formed by the horizontal phase fingerprint 146. This may be due to the difference in flow regime (e.g. homogeneous flow or bed flow) of each material. By considering the interrelationships between data values of a phase fingerprint 144, 146, for example using the controller 8, the flow regime of a material 2 may be determined. Determining the flow regime may comprise determining the presence of a bed flow and/or a height of a bed flow. In an example implementation, the machine learning algorithms described above may be used to determine the flow regime, for example using a classification algorithm e.g. the classification algorithm 100 described above.

When using a circumferential geometry of electrodes for characterising materials being conveyed in horizontal orientation, it may be beneficial to generate or use phase values associated with only a subset of the electrodes. That is, a subset of electrodes may be used to generate phase values primarily associated with a subregion of interest within the region. For example, in a horizontal orientation, a bed flow may occupy a portion (e.g. the lower half) of the pipe. In this instance, and with reference to FIG. 2, electrodes 5c-5j would be adjacent the bed flow (i.e. substantially solid material) and electrodes 5a-5b and 5k-5p would be adjacent the liquid phase (i.e. substantially liquid material). As such, by generating phase difference measurements associated with only electrodes 5a-5b and 5k-5p (and ignoring or avoiding measurements from electrodes 5c-5j), a phase fingerprint may be generated which is primarily associated with the liquid phase.

In an example implementation using only an upper half of the electrodes to generate a phase fingerprint, and providing said phase fingerprints as an input to a regression model similar to that described with reference to FIG. 14, a high correlation between predicted conductivity and actual conductivity is found, with a root mean squared error of 0.158 mS/cm.

In another example implementation, only a lower half of the electrodes may be used to generate a phase fingerprint, thereby generating a phase which is primarily associated with the solid phase. In such an implementation, characteristics of the solid phase may be determined e.g. bed height, flow regime. This may be particularly beneficial in high solid concentration flows, for example mixtures with 30-40% concentration of solid phase material.

Beneficially, using only a subset of the electrodes allows a characteristic (e.g. the liquid phase conductivity) to be determined with a reduced number of measurements and/or reduced processing power. As a result, this process may be performed more quickly than using all the available electrodes. This is particularly advantageous for real-time monitoring of flows. Any number of electrodes may be used as part of the subset of electrodes.

EIT, and the use of the reference value, is described in detail in WO 2016/038391. Using EIF to provide liquid phase conductivity as a reference value for EIT may be beneficial compared to other methods of providing a reference value for EIT. For example, using EIF may be cheaper and/or quicker and/or more accurate and/or more easily integrated compared to other methods.

EIT uses a plurality of electrodes to generate data indicative of a complex impedance of a material. The data indicative of a complex impedance of a material is then used to generate data indicative of a density of the material. A liquid phase conductivity may be provided as a reference value for the generation of data indicative of the complex impedance of the material and/or data indicative of the density of the material.

When using EIF with EIT, the plurality of electrodes used to generate data of a complex impedance of the material may be the same plurality of electrodes used to generate a phase fingerprint.

Alternatively, only a subset of electrodes may be used to generate the phase fingerprint. In one example arrangement, the subset of electrodes used to generate a phase fingerprint may be a subset of the electrodes used for the EIT process. Alternatively, additional electrodes (e.g. one electrode or five electrodes) may be provided in an upper region of the pipe in addition to and proximal to the electrodes used for the EIT process. That is, additional electrodes may be provided to and configured to operate as a conductivity sensor capable of determining a liquid phase conductivity of the mixture simultaneously to the EIT process. These additional electrodes may be referred to as a secondary sensor (i.e. the secondary sensor is provided in addition to the EIT electrodes). Beneficially, additional electrodes may be provided to the pipe with relative ease and without significantly disturbing the flow of the mixture.

It has been realised that EIF is resilient to electrode failure. That is, while a specific number of electrodes may be provided in the measurement system, only a subset are required to determine a characteristic of a material in the region of interest. Resilience to electrode failure is of particular interest in material characterisation processes in harsh conditions (e.g. dredging operation) where electrode failure is likely. Beneficially, EIF can determine a characteristic of a material even if multiple electrodes fail.

For example, new phase fingerprints generated with a single electrode removed and a pair of adjacent electrodes removed can be provided to the regression model described above with reference to FIG. 14. In this example, the liquid phase conductivities of materials associated with the new phase fingerprints can be determined. The error of determination with a single electrode removed is comparable to that with no electrodes removed (e.g. similar to the RMSE error described above with reference to FIG. 13 of 0.055 mS/cm). The error of determination with a pair of adjacent electrodes removed is found to be 0.134 mS/cm. That is, while the error of determination is higher for a pair of adjacent electrodes removed compared to no electrodes removed, the error rate is significantly low enough to provide accurate and meaningful determinations. For example, while the measurement apparatus 1 described above comprises sixteen electrodes, accurate determinations may be provided when using only a subset (e.g. eight) electrodes. Fewer electrodes may be used, depending on various factors such as, for example, the level of accuracy required for a particular application.

Regardless of the number of electrodes used to generate a phase fingerprint, all or some of the data values may be used to determine the characteristic of the material. For some applications, a subset of data values of a phase fingerprint may be sufficient to adequately determine the characteristic. Beneficially, using only a subset of the series of data values to determine the characteristic may provide a faster and/or less computationally intensive determination of the characteristic. In other applications, the use of additional data values (up to and including every data value) of the phase fingerprint may be used to increase the accuracy of a determination. For example, a full phase fingerprint may comprise one hundred and four (104) data values. The interrelationship between a subset of said one hundred and four data values, for example a subset of values (e.g. twenty values), may be adequate to determine a desired characteristic. The use of additional data values, for example fifty data values or all one hundred and four data (104) values, may increase the accuracy of such a determination.

Another method of using EIF to determine a characteristic of a material is by identifying a stability of the material's phase fingerprint. A material's phase fingerprint may change over time, for example due to process conditions. A changing phase fingerprint may indicate that a process is ongoing. A stable fingerprint may indicate that a process has finished. By monitoring the stability of the phase fingerprint, the status of the process may be determined.

In an example, EIF may be used to monitor a clean-in-place (CIP) process. In the CIP process, a manufacturing process which occurs in pipes may be halted such that cleaning materials may be passed through the pipe. Ideally, the cleaning materials may be passed through until the pipe is clean. However, due to lack of visibility and/or real-time measurement, it is difficult to know when the pipe is clean. By monitoring the stability of the phase fingerprint in such a pipe, it is possible to determine when the pipe is clean.

In an example CIP process, a first phase fingerprint is be generated during the cleaning phase. The first phase fingerprint is hence associated with a first time period (i.e. the time period over which measurements are made). The first phase fingerprint forms a first pattern. That is, there is an interrelationship between the data values of the first phase fingerprint. A second phase fingerprint is then generated during a second time period later than the first time period. The second phase fingerprint forms a second pattern. That is, there is an interrelationship between the data values of the second phase fingerprint.

The first and second phase fingerprints can be compared to determine a relationship between the first phase fingerprint and the second phase fingerprint. This may be performed by comparing the interrelationship for the first phase fingerprint to the interrelationship for the second phase fingerprint. If the interrelationship for the first phase fingerprint is significantly different to the interrelationship for the second phase fingerprint, this may indicate that the process is ongoing, i.e. that the pattern is changing and hence the phase fingerprint is unstable. That is, the relationship between the first and second phase fingerprints indicates change and/or instability. If the interrelationship for the first phase fingerprint is generally similar to the interrelationship for the second phase fingerprint, this may indicate that the process is complete, i.e. that the pattern is unchanging and hence the phase fingerprint is stable. That is, the relationship between the first and second phase fingerprints indicates stability and/or no change.

The relationship between the first and second phase fingerprint may be determined by providing the first and second phase fingerprint as an input to a machine learning model. Alternatively, the relationship may be determined by another computer implemented method capable of monitoring a pattern, e.g. a program which monitors the percentage change in each phase value. The machine learning model or computer implemented method may employ a threshold value, wherein if the difference between the phase fingerprints surpasses a certain threshold, a process condition (e.g. cleanliness) is deemed to have been achieved.

Alternatively, the interrelationship may be determined visually, for example by an operator viewing the first and second phase fingerprints. In this instance, the generation of the phase fingerprint enable an operator to view a status of the pipe in real-time, without gaining physical access to the pipe.

It may be beneficial to generate multiple additional phase fingerprints during multiple additional time periods later than the first and second time periods. Using multiple additional phase fingerprints, the longer-term stability may be monitored. The use of multiple additional phase fingerprints may be particularly beneficial in some instances where the phase fingerprint may vary in pattern due to reasons other than the stability to be monitored, e.g. the pattern may vary due to random noise. In such an instance, it may be beneficial to employ a threshold value which quantifies an allowable amount of variation below which the stability is deemed not to have changed.

When monitoring stability, it may be beneficial to determine a characteristic, for example a liquid phase conductivity, during a time period in which the material is determined to be stable. This characteristic may be referred to as a stable characteristic. Beneficially, such a stable characteristic may provide a baseline or reference value for the material being monitored. The stable characteristic, or a derivation thereof, may be used as a calibration, for example to designate a calibrated state of the material. Such a calibration may beneficially be applied during a time period in which the material is determined to be stable. Future characteristic determinations of the material may then be determined relative to this calibrated state. Beneficially, such a calibration provides a normalisation for systematic errors to measurements, for example contact resistance. Such a calibration may be especially beneficial in hydraulic transportation applications where a characteristic of the liquid phase portion of a mixture may vary over time (e.g. in response to temperature and/or chemical processes). In such an application, calibrating during a stable time period may reduce systematic errors caused by such variation.

When monitoring stability using phase fingerprints and a machine learning model, the machine learning model may be trained using phase fingerprints for materials which are known to be clean or unclean, or stable or unstable. This is known as supervised learning. The machine learning model may be trained only on phase fingerprints which are determined to be clean (for example, pure water). In this instance, it does not matter what the phase fingerprint appears like for an unclean system, as the machine learning model is monitoring for arrival at a clean condition.

Alternatively, the machine learning model may be trained using phase fingerprints for materials of which the cleanliness or stability is unknown. This is known as unsupervised learning. Unsupervised learning may be effective when used for monitoring stability or cleanliness as the model is required to determine a change in condition rather than a specific condition. In this instance, clustering may be attributed to known phase fingerprints such that they are classified into different classes. A subsequent unknown phase fingerprints may be classified into a first class. As the unknown phase fingerprint changes, the model may determine that the phase fingerprint is subsequently classified into a second class. As such, the model determines a change in class and may identify a change in stability despite the lack of explicit identification of a characteristic.

When comparing phase fingerprints, it is generally beneficial to compare a first and second phase fingerprint both generated using a measurement apparatus with the same geometry. For example, it may be beneficial to compare a first phase fingerprint generated using a measurement apparatus with a circumferential geometry to a second phase fingerprint generated with a measurement apparatus with a circumferential geometry. The measurement apparatuses used to generate the first and second phase fingerprints may or may not be the same apparatus.

In particular, when using a machine learning model, it is generally beneficial to train the model using phase fingerprints generated with the same geometry which is used to generate an unknown phase fingerprint for an unknown material for which it is desirable to determine a characteristic.

However, while it is beneficial to use apparatus with the same geometry, it is not necessary to use an apparatus of the same scale. Rather, a different scale may be used to adequately determine a characteristic. For example, an arrangement of electrodes may be circumferential in geometry but have different diameters. For example, a phase fingerprint generated using a circumferential arrangement of 0.1 m diameter may be comparable to (i.e. share the same interrelationships between data values as) a phase fingerprint generated using a circumferential arrangement of 0.305 m diameter. As such, a determination of a characteristic may be made for a material in a first pipe of a first diameter by comparing it to a phase fingerprint generated for a material in a second pipe of a second diameter.

The use of a different scale may result in a reduced accuracy associated with the determination of a characteristic. However, for many applications the use of a different scale may adequately determine the characteristic. This beneficially allows characterisation of materials using a larger range of measurement systems with different pipe diameters.

A machine learning model may be trained with known phase fingerprints generated using circumferential arrangements of a first diameter, and be used to determine a characteristic for unknown phase fingerprints generated using circumferential arrangements of a different size. This beneficially simplifies the collection of both training data and unknown data for which a determination is desired.

The above described processes, for example with reference to FIGS. 7 to 15B, demonstrate EIF using phase fingerprints. EIF can also be performed using amplitude fingerprints. That is, amplitude fingerprints can be used to determine a characteristic of a material within a region.

Figure 16:
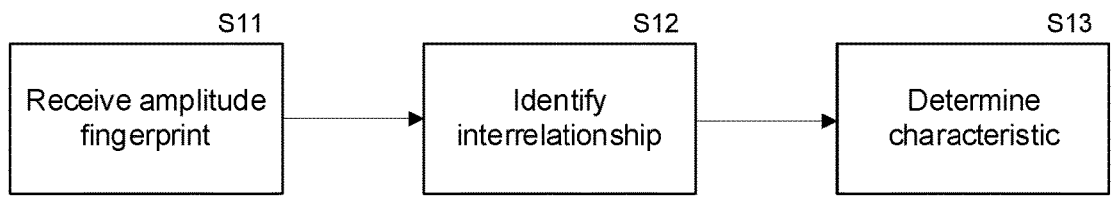
FIG. 16 shows a process to determine a characteristic of a material.

FIG. 16 shows a process running on the controller 8 to determine a characteristic of a material. The process of FIG. 16 corresponds to the process of FIG. 7, but applied to amplitude fingerprints rather than phase fingerprints. At step S11, the controller 8 receives an amplitude fingerprint. The amplitude fingerprint is defined by a series of data values as described above, the series of data values corresponding to amplitude values for the material in a region of interest. At step S12, the controller identifies an interrelationship between at least some of the data values of the amplitude fingerprint. At a step S13, the controller determines the characteristic of the material based on the identified interrelationship.

As described above, large particulates in a mixture typically exhibit a simple resistance (i.e. no phase difference is observed between the applied stimulation signal and a corresponding received stimulation signal). Rather, an amplitude relationship is observed between the applied stimulation signal and a corresponding received stimulation signal. As such, amplitude fingerprints are particularly beneficial for determining characteristics of the mixture which are related to solid-phase material and/or larger particulates in the mixture.

A machine learning model, for example machine learning models described above, can be used to identify the interrelationship and hence determine the characteristic. In this instance, the machine learning model is trained using amplitude fingerprints.

Subsequently, when a new amplitude fingerprint is provided to the trained machine learning model, the model may identify an interrelationship between features of the new amplitude fingerprint and associate this interrelationship with a specific characteristic using its trained parameters. All discussion above regarding the machine learning model described with reference to phase fingerprints, for example the architecture, methods of training etc., are equally applicable to using the machine learning model with amplitude fingerprints.

Alternatively, both amplitude fingerprints and phase fingerprints may be used to determine a characteristic of a material. In a first example, a machine learning model can be trained using both amplitude fingerprints and phase fingerprints. In this way, the model can learn interrelationships between data points in amplitude fingerprints, interrelationships between data points in phase fingerprints, and optionally even interrelationships between corresponding amplitude fingerprints and phase fingerprints.

Figure 17:
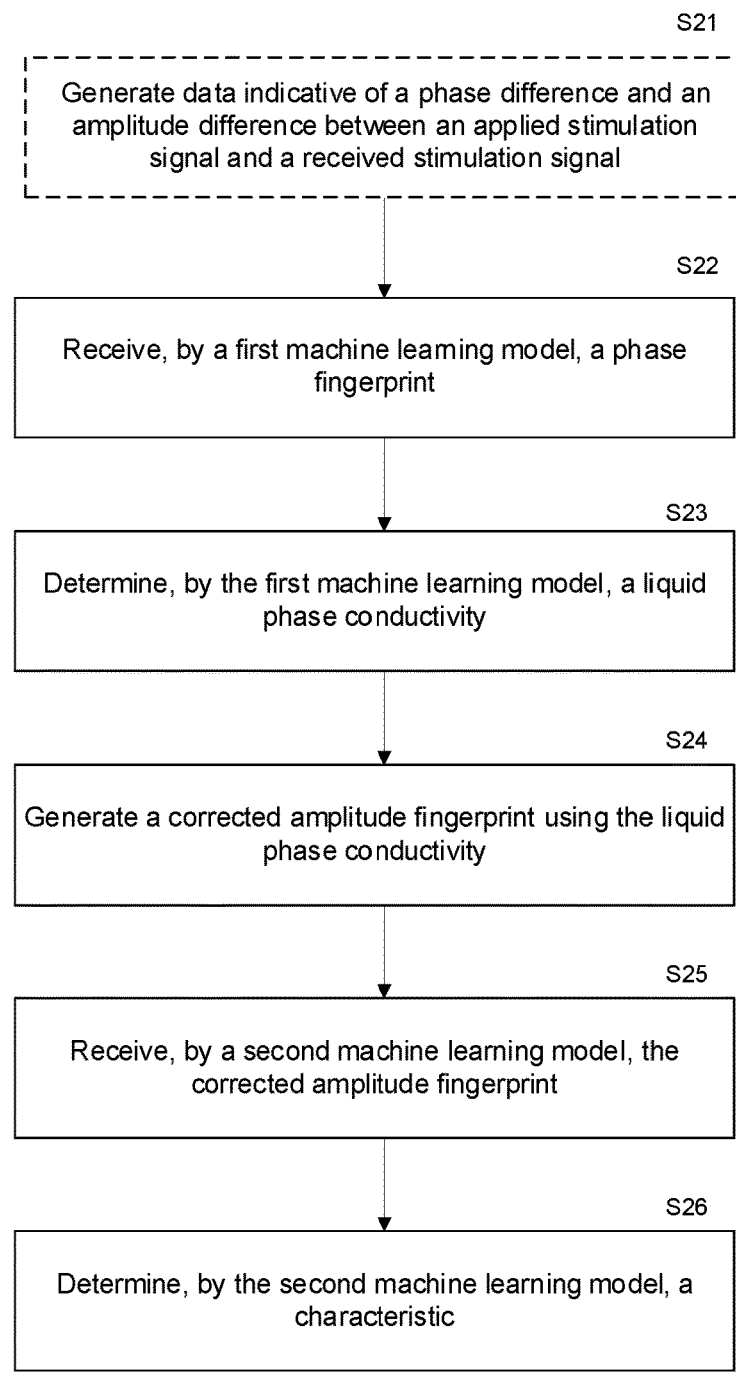
FIG. 17 depicts an example process in which both phase fingerprints and amplitude fingerprints are used.

FIG. 17 depicts another example process in which both phase fingerprints and amplitude fingerprints are used. In this arrangement, two machine learning models are used. A primary machine learning model is trained, for example in a manner as described above, using phase fingerprints. The secondary machine learning model is trained, for example in a manner as described above, using amplitude fingerprints.

At a first step S21, a series of data values is generated, the data values being indicative of a phase difference and an amplitude relationship between an applied stimulation signal and a received stimulation signal as applied to a material in a region of interest. This can be performed, for example, using the apparatus described above and with reference to FIGS. 1, 2, 4 and/or 6. The generation of data values may be performed, for example, using a controller. The generation of data values may be based upon data monitored by a stimulation monitor.

The series of data values defines an electromagnetic fingerprint. A phase fingerprint (each data value of which is indicative of a phase difference between the applied stimulation signal and the received stimulation signal) and/or an amplitude fingerprint (each data value of which is indicative of an amplitude relationship between the applied stimulation signal and the received stimulation signal) can be extracted from the electromagnetic fingerprint. As such, it can be said that the electromagnetic fingerprint comprises a phase fingerprint and an amplitude fingerprint.

The first step S21 is depicted in FIG. 17 as being optional. It should be understood that the process of generating data may be performed as part of the process of determining characteristics of the material, or it may be performed separately. For example, data indicative of the phase difference and amplitude relationship may be generated and stored. At a later date and/or in a different location, this data can then be provided to the machine learning models to determine the characteristics (i.e. to perform steps S22 to S36)

At a second step S22, a phase fingerprint is received by the primary machine learning model. The phase fingerprint is the phase fingerprint extracted from the series of data values of the first step S21. Preferably (for example due to the advantages described above), the phase fingerprint is normalised.

At a third step S23, the primary machine learning model determines a liquid phase conductivity of the material. That is, the primary machine learning model, having been trained using a training set of phase fingerprints, identifies an interrelationship between at least some of the data values of the phase fingerprint and determines the liquid phase conductivity based on the interrelationship. The characteristic at the third step S23 may be referred to as a first characteristic. A regression model is used as the primary machine learning model, such that the primary machine learning model outputs a numerical value (i.e. the liquid phase conductivity).

At a fourth step S24, an amplitude fingerprint is corrected using the liquid phase conductivity. The amplitude fingerprint is the amplitude fingerprint extracted from the series of data values of the first step S21. The liquid phase conductivity is the liquid phase conductivity determined at the third step S23. The correction may be, for example, a scaling of amplitude data using a value of the liquid phase conductivity. The purpose of the correction is to minimise or eliminate the effect that the liquid phase portion of the material has on the amplitude data of the received stimulation signal. As such, the corrected amplitude fingerprint is more representative, or entirely representative, of the effect that the solid phase portion of the material has on the amplitude data. The correction may be referred to as a calibration. Correcting the amplitude fingerprint may also be referred to as modifying the amplitude fingerprint.

The amplitude fingerprint, both before and after correction, is non-normalised so as to retain information relating to the relative amplitude of different measurements. The output of the fourth step is a corrected amplitude fingerprint. The third step S23 may be performed by a controller or general purpose computer.

At a fifth step S25, the corrected amplitude fingerprint is received by the secondary machine learning model.

At a sixth step S26, the secondary machine learning model determines a characteristic of the material. In particular, the characteristic is a characteristic of a solid phase portion of the material. The characteristic can be, for example, a concentration of one or more solid substances (e.g. concentration of sand in a mixture of substances). When determining a concentration, the machine learning model can be a regression model, for example the regression model 102 described above, such that a predicted concentration value is output. Alternatively, the machine learning model can be a classification model, for example the classification model 100 described above, such that the material in question can be classified as having a concentration of the substance in a specific range. The characteristic can also be, for example, an identification of a type of substance. For example, this process may be performed to determine whether "substance A" is present in the mixture, or for example if any solids are present in the mixture. Typically, to identify a type of substance a classification model is an appropriate choice for the machine learning model. Rather than the classification model 100 described above, a support vector machine may be used for classification. The characteristic at the sixth step S25 may be referred to as a secondary characteristic.

It is noted that the fifth and sixth steps S25, S26 can be performed in isolation from the preceding steps. For example, the secondary machine learning model may simply be provided with an amplitude fingerprint and be used to determine a characteristic based thereon. A corrected amplitude fingerprint can be provided to the secondary machine learning model which is not corrected using a liquid phase conductivity value determined at the third step S23. Rather, the amplitude fingerprint can be corrected with a value for liquid phase conductivity which is, for example, determined theoretically or using a liquid phase conductivity sensor. However, given the accuracy with which the liquid phase conductivity can be determined using phase fingerprints, it may be particularly beneficial use said determined liquid phase conductivity value.

Figure 18A:
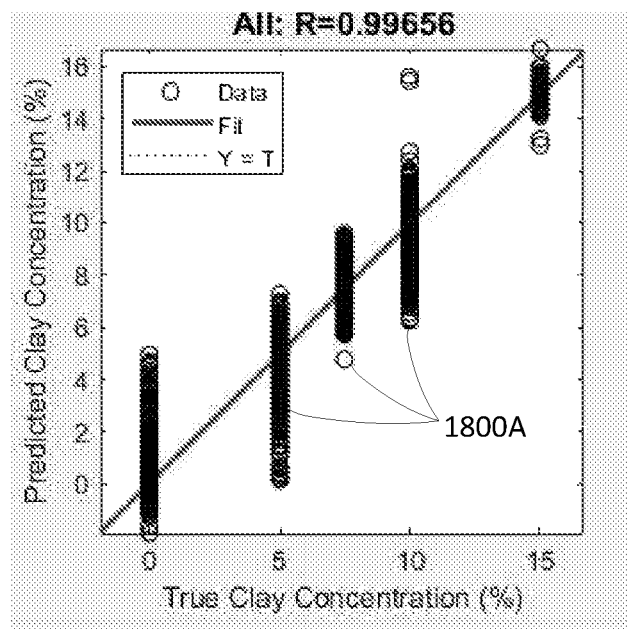
FIGS. 18A and 18B show results representing the performance of a regression model.
Figure 18B:
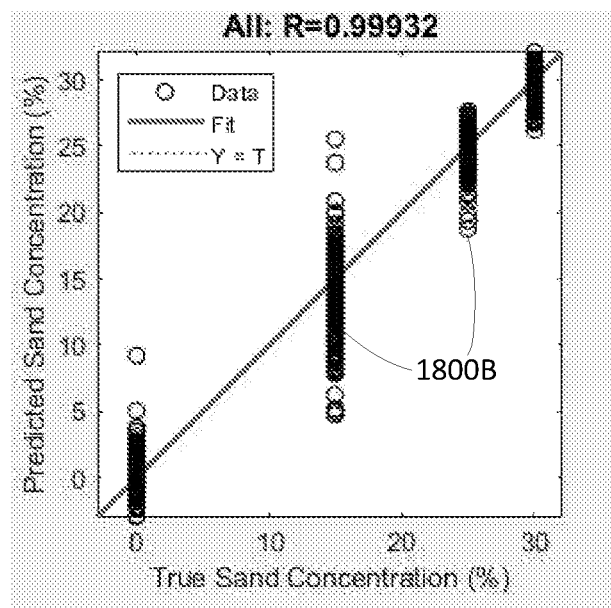

FIGS. 18A and 18B show results representing the performance of a regression model in determining a concentration of clay and sand, respectively, in mixtures, using the process as described in FIG. 17. The regression model used is of the type described above and with reference to FIG. 8B. The mixtures comprise water only, water and clay, water and sand, or water/sand/clay mixtures. The concentration of sand in each mixture is 0 wt %, 15 wt %, 25 wt % or 30 wt %. The concentration of clay in each mixture is 0 wt %, 5 wt %, 7.5 wt %, 10 wt %, 15 wt %. The regression model is used at the fifth and sixth steps S25, S26 of the process of FIG. 17. That is, it receives corrected amplitude fingerprints for each of the mixtures. The regression model then outputs a determined concentration of sand and a determined concentration of clay.

To produce the performance graphs of FIGS. 18A and 18B, the true concentration of sand and clay are compared to the concentrations determined by the regression model. The determined concentrations are referred to as predicted sand concentrations. A data point 1800A is plotted for each predicted clay concentration generated by the regression model and a data point 1800B is plotted for each predicted sand concentration generated by the regression model. Each data point 1800A, 1800B plotted is associated with an electromagnetic fingerprint provided to the regression model.

It can be seen that there is a strong correlation between the determined concentration and the actual concentration. For example, the data points 1800B indicating an actual sand concentration of 25 wt % correspond to a determined sand concentration of approximately 25 wt %. Some variation is seen, for example in this instance the determined sand concentration varies from approximately 18 wt % to 28 wt %, but these outliers are a minority of data points. In fact, for sand prediction, the coefficient of determination across all data points 1800B is >0.99. Similarly, for clay prediction, the coefficient of determination across all data points 1800A is >0.99 wtc/o.

Further to the use of amplitude fingerprints, the amplitude of data within a phase fingerprint can be used to determine characteristics of a mixture relating to solid phase portions of the mixture. This amplitude of data within a phase fingerprint can be referred to as a phase strength, and indicates the strength of the received phase data in the received stimulation signal. The phase strength can be utilised by using non-normalised phase data (i.e. non-normalised phase fingerprints). A process which uses this approach is described below with reference to FIG. 19.

Figure 19:
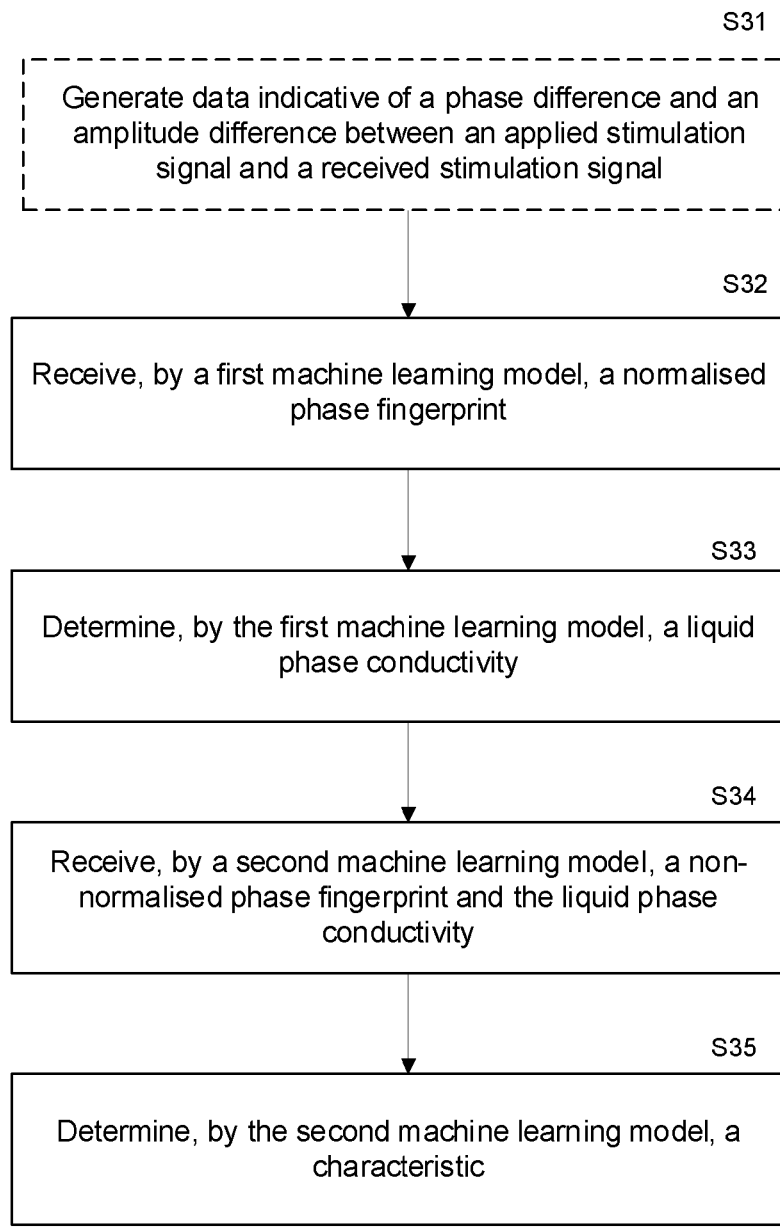
FIG. 19 depicts an example process which utilises both normalised and non-normalised phase fingerprints.

FIG. 19 depicts an example process which utilises both normalised and non-normalised phase fingerprints. In this arrangement, two machine learning models are used. The primary machine learning model is a regression model, for example the regression model 102 described above, and is trained with normalised phase fingerprints. The secondary machine learning model is a classification-type model, for example the classification model 100 described above or a support vector machine. In particular, the secondary machine learning model is trained using non-normalised phase fingerprints of materials for which the liquid phase conductivity is known. That is, the secondary machine learning model is provided with a training set including known non-normalised phase fingerprints and associated liquid phase conductivity values.

At a first step S31, a series of data values is generated, the data values being indicative of a phase difference between an applied stimulation signal and a received stimulation signal as applied to a material in a region of interest. This can be performed, for example, using the apparatus described above and with reference to FIGS. 1, 2, 4 and/or 6. The generation of data values may be performed, for example, using a controller. The generation of data values may be based upon data monitored by a simulation monitor.

The series of data values defines an electromagnetic fingerprint. A phase fingerprint (each data value of which is indicative of a phase difference between the applied stimulation signal and the received stimulation signal) can be extracted from the electromagnetic fingerprint. As such, it can be said that the electromagnetic fingerprint comprises a phase fingerprint.

The first step S31 is depicted in FIG. 19 as being optional. It should be understood that the process of generating data may be performed as part of the process of determining characteristics of the material, or it may be performed separately. For example, data indicative of the phase difference may be generated and stored. At a later date and/or in a different location, this data can then be provided to the machine learning models to determine the characteristics (i.e. to perform steps S32 to S35).

At a second step S32, a normalised phase fingerprint is received by the primary machine learning model. The normalised phase fingerprint is the phase fingerprint extracted from the series of data values of the first step S31 which has been normalised.

At a third step S33, the primary machine learning model determines a liquid phase conductivity of the material. That is, the primary machine learning model, having been trained using a training set of normalised phase fingerprints, identifies an interrelationship between at least some of the data values of the normalised phase fingerprint and determines the liquid phase conductivity based on the interrelationship. The characteristic at the third step S33 may be referred to as a first characteristic.

At a fourth step S34, a non-normalised phase fingerprint is received by the secondary machine learning model. The non-normalised phase fingerprint is the phase fingerprint extracted from the series of data values of the first step S31. The secondary machine learning model also receives the liquid phase conductivity of the material, for example as determined in the third step S33.

At a fifth step S35, the secondary machine learning model determines a characteristic of the material. In particular, the characteristic is a characteristic of a solid phase portion of the material. As the secondary machine learning model is a classification-type model (e.g. a classification model or a support vector machine), the output of the secondary machine learning model is a group or class of characteristics into which the material belongs. The classes may represent characteristics such as an identification of a type of substance. For example, this process may be performed to determine whether "substance A" is present in the mixture, or for example if any solids are present in the mixture. The classes may represent other characteristics, for example a concentration or amount of a substance (e.g. an indication that the concentration of the substance falls within a particular range). The characteristic at the fifth step S35 may be referred to as a secondary characteristic.

The process of FIG. 19 is particularly useful in predicting the presence of one or more substances i.e. identifying one or more substances. That is, this process is particularly useful for classifying the substances within a mixture. It should be understood that different classes could be used which relate to material characteristics, and in particular characteristics of mixtures of liquid phase and solid phase substances.

In an alternative arrangement, the secondary machine learning model may be a regression model, rather than a classification-type model, configured to output a value of a characteristic of the material.

In an example implementation of the above process, the process of FIG. 19 is used to classify materials which are mixtures. In particular, there are four classes of mixtures: water only (class 1), water and sand (class 2), water and clay (class 3), and water, sand and clay (class 4). In this example, the first and secondary machine learning models comprise the regression model 102 as described above. Over 70,000 phase fingerprints are generated for a variety of mixtures each belonging to one of the four classes. 75% of the phase fingerprints are used to train the machine learning models, 15% of the phase fingerprints are used for validation, and 10% of the phase fingerprints are used for testing.

Figures 20, 21:
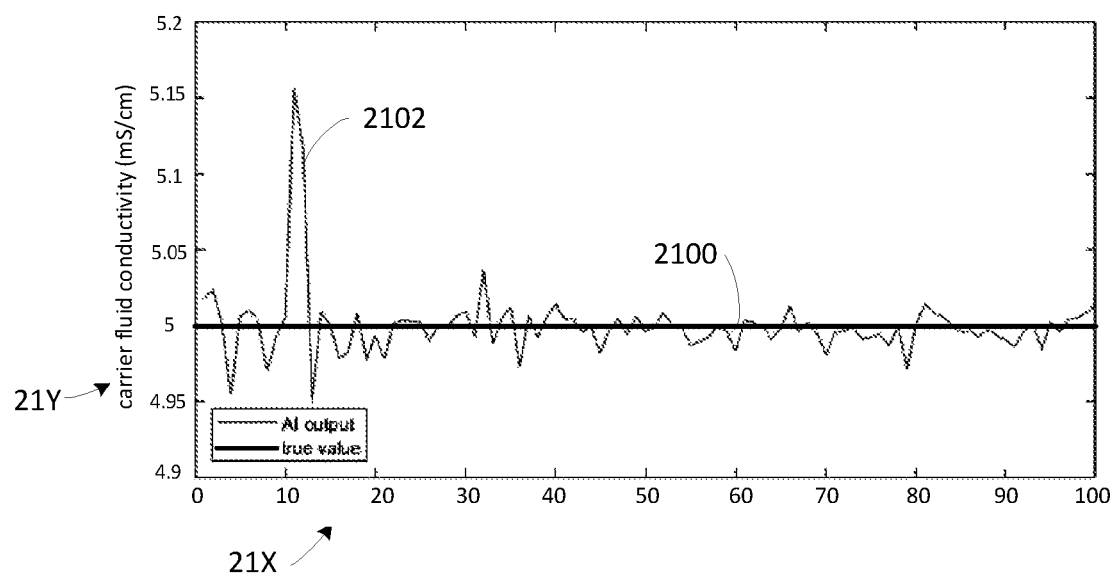
FIG. 20 depicts a confusion matrix demonstrating the performance of a regression model.
FIGS. 21 to 23 illustrate the performance of EIF when used to track liquid phase conductivity of a material in various process conditions.

FIG. 20 depicts a confusion matrix demonstrating the performance of the regression model 102. To produce the confusion matrix, the actual class of each tested mixture is compared to the class output by the regression model 102 (i.e. the classification determined by the model). It can be seen that there is a misclassification rate of 3.9%. However, for the majority (over 96%) of mixtures, the correct class is determined.

Figure 22:
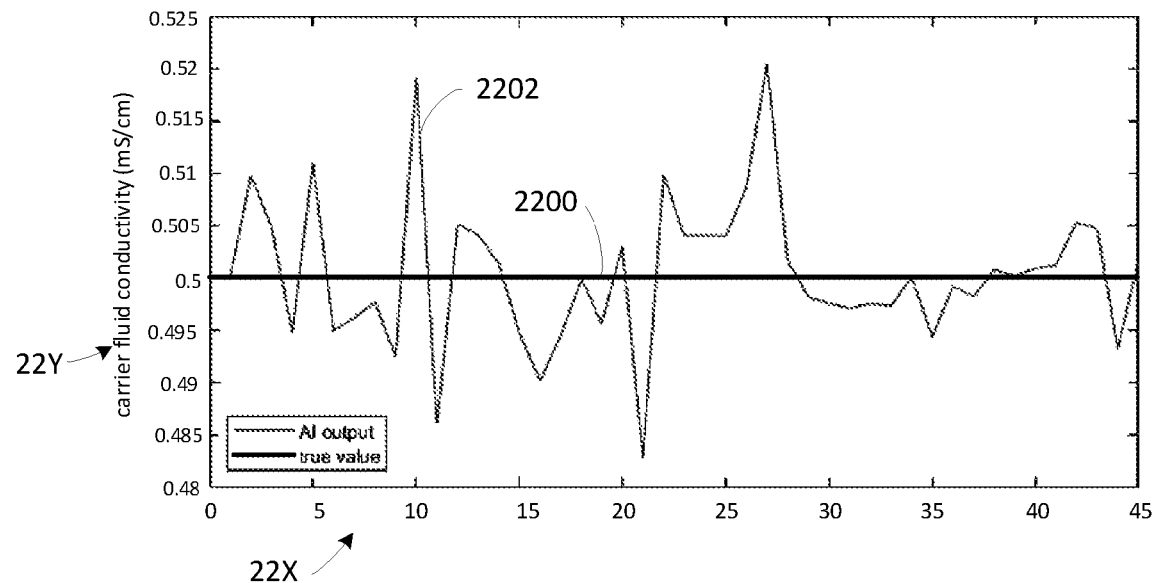
Figure 23:
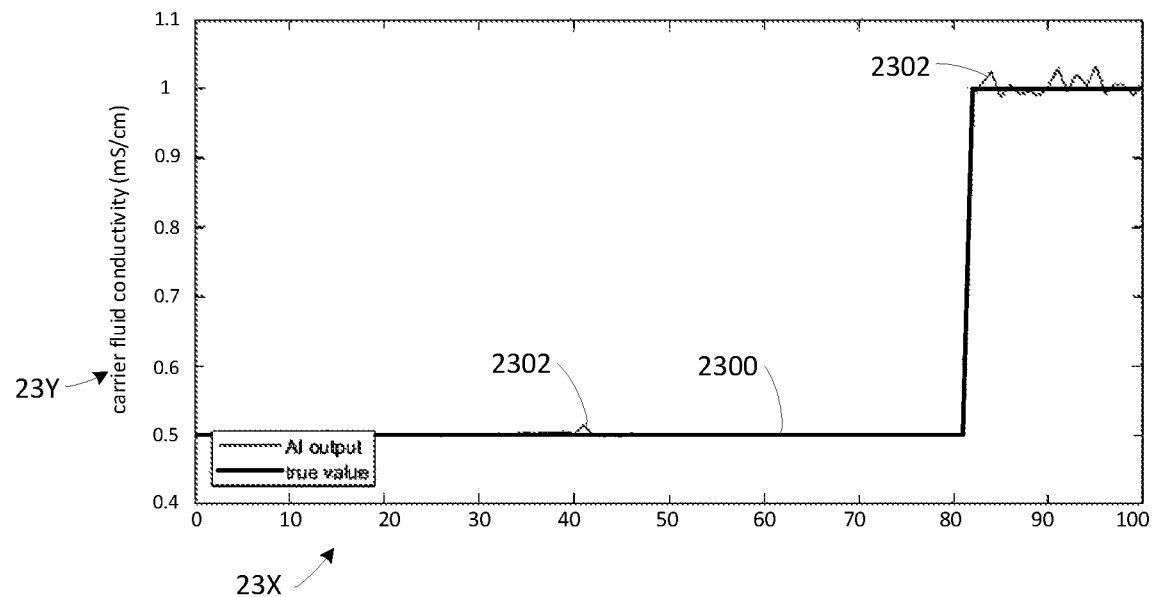

FIGS. 21 to 23 illustrate the performance of EIF when used to track liquid phase conductivity of a material in various process conditions. In this example implementation, phase fingerprints are used (i.e. no amplitude fingerprints are used). The method used is similar to that described above, for example with reference to FIGS. 11A and 11B.

In this example, a mixture is passed through a pipe. The mixture is contained in a closed flow loop and monitored at a position within the loop using an apparatus as described above, with electrodes arranged in a circumferential arrangement. The position hence monitors a particular segment of the pipe. The mixture comprises a liquid phase portion and optionally a solid phase portion. Three different processes are shown.

In each process, the concentration of each substance in each mixture is fixed when considering the mixture in the entire closed loop. However, as the mixture flows through the pipe, the actual concentration in the monitored segment may vary, for example due to process turbulence, flow regime and mixing within the pipe. The orientation and distribution of solid phase material within the pipe also changes over time depending. In all processes, the flow velocity of the mixture passing through the pipe varies from 1 m/s to 4 m/s.

In a first process, the performance of which is illustrated in FIG. 21, the mixture comprises a mixture of liquid, sand and clay. The liquid may be referred to as a carrier fluid. The liquid has a conductivity of 5 mS/cm. In this first process, the solid phase concentration is approximately 25 wt %, with a sand concentration of 15 wt % and a clay concentration of 10 wt %.

In a second process, the performance of which is illustrated in FIG. 22, the mixture comprises a mixture of liquid, sand and clay. The liquid may be referred to as a carrier fluid. The liquid has a conductivity of 0.5 mS/cm. In this second process, the solid phase concentration is approximately 20 wt %, with a sand concentration of 15 wt % and a clay concentration of 5 wt %.

In a third process, the performance of which is illustrated in FIG. 23, the mixture consists of liquid. For a first period of time, the liquid has a conductivity of 0.5 mS/cm. At a time T, the composition of the liquid flowing through the pipe is changed. The new liquid composition has a conductivity of 1 mS/cm.

An electrical parameter is monitored, as described in detail above, over time. From the monitored electrical parameter, data values indicative of a phase difference are generated i.e. phase fingerprints are generated. In this example, 104 measurements are taken and 104 phase values are generated which define a first phase fingerprint. Subsequently, a second 104 measurements are taken and a second 104 phase values are generated which define a second phase fingerprint. There is a temporal separation between the collection of data resulting in the first phase fingerprint and the collection of data resulting in the second phase fingerprint. Therefore, each phase fingerprint is representative of the mixture at a different time. Multiple phase fingerprints are collected in this way, in a series of iterations. In one example, 100 phase fingerprints are generated, each corresponding to a different time. As such, it can be said there are 100 iterations. However, it should be understood that any number of iterations can be used depending on the desired monitoring time.

Each phase fingerprint is provided to a regression model of the type described above. The model provides, as an output, data indicative of the liquid phase conductivity determined in association with each phase fingerprint. That is, for each phase fingerprint input to the model, a liquid phase conductivity value is determined. As such, the liquid phase conductivity can be monitored over time.

FIG. 21 illustrates data generated during the first process. The liquid has a conductivity of 5 mS/cm. In this first process, the solid phase concentration is approximately 25 wt %, with a sand concentration of 15 wt % and a clay concentration of 10 wt %. Over a period of time in which 100 phase fingerprints are generated, the flow velocity varies within the boundaries indicated above. Over this same period of time, the distribution of solids in the mixture will change, for example due to mixing and varying flow regimes in the pipe.

The Y axis 21Y indicates liquid phase conductivity (also referred to as carrier fluid conductivity). The X axis 21X indicates the iteration number. As such, each data value plotted corresponds to a liquid phase conductivity for a particular iteration, and hence associated with a particular time. There are 100 iterations.

A first data series 2100, plotted as a line, illustrates the actual liquid phase conductivity over time, i.e. 5 mS/cm. A second data series 2102, plotted as a line, illustrates the liquid phase conductivity as determined by the machine learning model. It can be seen that the determined value varies between approximately 4.95 mS/cm and 5.15 mS/cm. The majority of the determined values of the second data series 2102 are approximately 5 mS/cm with a variation of approximately ±0.3 mS/cm. Therefore, the method accurately determines the liquid phase conductivity despite variations in other process conditions.

FIG. 22 illustrates data generated during a second process. In this example, the mixture comprises a liquid phase portion, referred to as a carrier fluid, with a conductivity of 0.5 mS/cm. In this second process, the solid phase concentration is approximately 20 wt %, with a sand concentration of 15 wt % and a clay concentration of 5 wt %. Over a period of time in which 45 phase fingerprints are generated, the flow velocity varies within the boundaries indicated above. Over this same period of time, the location of various solids in the mixture will change, for example due to mixing and varying flow regimes in the pipe.

The Y axis 22Y indicates liquid phase conductivity (also referred to as carrier fluid conductivity). The X axis 22X indicates the iteration number. As such, each data value plotted corresponds to a liquid phase conductivity for a particular iteration, and hence associated with a particular time. There are 45 iterations.

A first data series 2200, plotted as a line, illustrates the actual liquid phase conductivity over time, i.e. 0.5 mS/cm. A second data series 2202, plotted as a line, illustrates the liquid phase conductivity as determined by the machine learning model. It can be seen that the determined value varies between approximately 0.48 mS/cm and 0.52 mS/cm. The determined values can be said to be approximately 0.5 mS/cm with a variation of approximately ±0.02 mS/cm. Therefore, the method accurately determines the liquid phase conductivity despite variations in other process conditions.

FIG. 23 illustrates data generated during a third process. In this example, the mixture consists of liquid phase portion and contains no solids. Over a period of time in which 100 phase fingerprints are generated, the flow velocity varies within the boundaries indicated above. That is, there are 100 iterations. For a first period of time, the liquid phase portion has a conductivity of 0.5 mS/cm. At a time T, which occurs approximately during iteration number 82, the composition of the liquid flowing through the pipe is changed. The new composition has a conductivity of 1 mS/cm.

The Y axis 23Y indicates liquid phase conductivity (also referred to as carrier fluid conductivity). The X axis 23X indicates the iteration number. As such, each data value plotted corresponds to a liquid phase conductivity for a particular iteration, and hence associated with a particular time.

A first data series 2300, plotted as a line, illustrates the actual liquid phase conductivity over time. As such, the first data series 2300 is a straight line at 0.5 mS/cm for iterations 1 through 81. At approximately iteration 82 the first data series 2300 increases near-discontinuously to the new conductivity value of 1 mS/cm. A second data series 2302, plotted as a line, illustrates the liquid phase conductivity as determined by the machine learning model. The second data series 2302 generally overlies the first data series 2300 for iterations 1 through 81, indicating that the determined liquid phase conductivity is comparable to the actual liquid phase conductivity. At approximately iteration 82, the second data series 2302 increases near-discontinuously. For iterations 82 through 100, the second data series is approximately 1 mS/cm, with fluctuations of approximately 0.03 mS/cm. It can be therefore seen that, both before and after the change in liquid phase composition, the model accurately determines the liquid phase conductivity. Therefore, the method accurately determines the liquid phase conductivity despite variations in other process conditions.

Examples are described above for the use of EIF in combination with particular liquids (e.g. water) and particular solids (e.g. clay, sand etc.). It should be understood that these examples are illustrative in nature and the methods herein can be used on any materials.

The methods and apparatus described above are of particular use in various industrial processes. Particular examples of the use of these methods and apparatus (e.g. the use of EIF) are as follows.

EIF can be used in the field of mining or mineral processing. In mining or mineral processing, it may be beneficial to identify the composition of various materials. EIF can be used to determine the presence of one or more substances (e.g. iron, silica, gold etc.) in a mixture of materials (e.g. in ore). In this instance, a classification model may be of particular use, such that, given a phase fingerprint of the mixture in question, an output may be provided which is a classification indicating the presence of one or more of these substances. EIF can also be used to determine the concentration of one or more substances. In this instance, a regression model may be of particular use to output a predicted concentration. Alternatively, and as described in various examples above, a classification model can be used to output a determined class of concentrations (e.g. a range of concentrations). Furthermore, it is noted that EIF is particularly useful when used in combination with mining due to the generally inaccessible nature of the material and its environment, which may be for example down a bore hole. As such, measuring a liquid phase conductivity in a known way, for example using a sensor, is typically difficult if not impossible. Using EIF provides a method of determining a liquid phase conductivity in such inaccessible environments.

EIF can be used in the field of slurry transport, for example via hydraulic conveying or other transport processes. Examples of such processes are dredging, sewage transport, waste disposal and waste treatment. In such applications, it may be beneficial to gain knowledge of the proportion of solid material within a mixture being transported (e.g. a slurry). In particular, it may be beneficial to determine the mass of solid material within the mixture (i.e. the density of the mixture). By periodically sampling the mixture, and performing EIF, a determination of the concentration and/or mass of solid material can be acquired and hence a density of the mixture can be determined. Similar to as described above with reference to mining, concentration determinations can be made via classification or regression models. Furthermore, it may be beneficial to identify the presence of one or more solids within the mixture, in which case a classification model may be used. In other transport processes, for example oil and gas transporting (e.g. in petroleum operations), the mixture may contain a gas fraction. That is, the mixture may comprise a liquid phase portion and a gas phase portion (and optionally also a solid phase portion). In such instances, EIF can be used to determine characteristics of the gas portion in addition to, or alternatively to, any liquid phase and/or solid phase portions.

These examples are provided for illustrative purposes and should not be construed as limiting. It should be evident to the skilled person that any material or mixture of materials may beneficially be studied using EIF.

In this disclosure, phase fingerprints and amplitude fingerprints are referred to as separate entities. However, it should be understood that a single data set may contain both information relating to amplitude and information relating to phase. As such, a single fingerprint (e.g. an electromagnetic fingerprint) may be used which represents both a phase fingerprint and an amplitude fingerprint.

The same considerations with respect to apparatus geometry and training the machine learning model, as described above with reference to phase fingerprints, apply equally to amplitude fingerprints. Similarly, discussions regarding the architecture, training and use of machine learning models, as described above with reference to phase fingerprints, apply equally to amplitude fingerprints. Furthermore, the use of phase fingerprints is described above for determining a stability of a material within a region. Amplitude fingerprints may also be used for determining a stability of a material within a region, for example by comparing a first and second amplitude fingerprint and determining a stability of the material based upon the comparison. It should be understood that a changing amplitude fingerprint may indicate that a process is ongoing and a stable amplitude fingerprint may indicate that a process has finished.

In the above examples, specific machine learning techniques (e.g. models, algorithms, number of neurons) have been described. It should be understood that these are illustrative in nature and not limiting. That is, while the described machine learning techniques described are particularly applicable to the described example uses, a range of techniques may be used which may be more applicable for other example uses.

It should be understood that the sensor apparatus 4 as described above is not an essential means for the invention. Rather, the sensor apparatus 4 is used in the above descriptions to illustrate means of mounting electrodes within or about a measurement apparatus.

In this document, the mixtures described comprise both liquid phase material and solid material. In some instances (e.g. horizontal bed flows) a sub-region of the material may comprise primarily liquid phase material, in which case it may be referred to as liquid phase. However, the liquid phase portion may comprise some solid material in addition. Similarly, bed flows comprise primarily solid material, but may contain some liquid phase matter in addition.

Reference has been made herein to determining a concentration of a substance. It should be understood that a concentration may be determined from other related characteristics, for example a density, a mass, an amount.

The machine learning models described herein are primarily trained using supervised learning. For example, a model may be trained using phase fingerprints for which the characteristic to be determined is known. However, models may alternatively be trained using unsupervised learning. For example, a model may be trained using a series of phase fingerprints for which the characteristic is not known.

Different interrelationships may be relevant for different characteristics. For example, the flow regime of a mixture may affect the phase fingerprint and/or amplitude fingerprint in a different way compared to the concentration of solid inclusions in a mixture. For example, the mixing state of a formulation may affect the phase fingerprint and/or amplitude fingerprint in a different way compared to the concentration of electrolytes. While in known methods of material characterisation, for example EIT, it is difficult to separate variables (e.g. mixing state and electrolyte concentration), EIF provides a means of characterising materials in a manner which is sensitive to one variable (e.g. mixing state) and insensitive to another (e.g. electrolyte concentration).

EIF used in combination with a machine learning model may be particularly effective when dealing with multiple characteristics. A machine learning model may use a single feature, for example electrolyte concentration. In this instance, the model will be trained using phase fingerprints or amplitude fingerprints for which the single feature is known. Subsequently, the model will learn to determine the single feature for unknown phase fingerprints or amplitude fingerprints. Alternatively, a machine learning model may be used with multiple features, for example electrolyte concentration, mixing state and surfactant concentration. This may be known as a training matrix. Subsequently, the model will learn to determine multiple features for unknown phase fingerprints or amplitude fingerprints.

The described and illustrated embodiments are to be considered as illustrative and not restrictive in character, it being understood that only the preferred embodiments have been shown and described and that all changes and modifications that come within the scope of the inventions as defined in the claims are desired to be protected. For example, the precise shape and configuration of the various components, and/or the arrangement of processing operations may be varied. In relation to the claims, it is intended that when words such as "a," "an," "at least one," or "at least one portion" are used to preface a feature there is no intention to limit the claim to only one such feature unless specifically stated to the contrary in the claim.

The invention claimed is:

1. An apparatus for determining a characteristic of a material within a region within a pipe or vessel, the apparatus comprising:
a first plurality of electrodes mounted on an inner wall of the pipe or vessel around the region or arranged linearly along a linear structure fixably or removably located within the pipe or vessel and within the region;
an energisation source arranged to apply an applied stimulation signal to at least one of said first plurality of electrodes;
a stimulation monitor arranged to monitor an electrical parameter at a plurality of other electrodes of the first plurality of electrodes in response to said applied stimulation signal, the stimulation monitor being configured to generate a received stimulation signal for each of the plurality of other electrodes of the plurality of electrodes based on the monitored electrical parameter;
a monitor configured to generate a series of data values, each data value being indicative of a phase difference and/or an amplitude relationship between the applied stimulation signal and the received stimulation signal associated with one of the other electrodes of the first plurality of electrodes, said series of data values defining an electromagnetic fingerprint;
a controller configured to:
receive the electromagnetic fingerprint;
identify an interrelationship between at least some of the data values of the electromagnetic fingerprint;
determine the characteristic based on the interrelationship.

2. The apparatus of claim 1, wherein the controller further comprises a machine learning model trained using a training set of electromagnetic fingerprints representing a set of materials to generate trained parameters, the machine learning model arranged to:
receive the electromagnetic fingerprint as an input to the trained machine learning model;
identify the interrelationship using the trained parameters; and
generate, based on the interrelationship, data indicating the characteristic.

3. The apparatus of claim 2, wherein the machine learning model is trained using a set of known electromagnetic fingerprints representing a set of materials for which the characteristic is known.

4. The apparatus of claim 2, wherein the machine learning model is trained using a set of known electromagnetic fingerprints representing a set of materials for which the characteristic is unknown.

5. The apparatus claim 2, wherein the first plurality of electrodes are arranged with a first geometry and wherein the known electromagnetic fingerprints are generated using a second plurality of electrodes arranged with a second geometry substantially equivalent to the first geometry.

6. The apparatus of claim 2, wherein:
the electromagnetic fingerprint is a primary electromagnetic fingerprint;
the interrelationship is a primary interrelationship;
the characteristic is a primary characteristic;
the monitor is further configured to generate a secondary electromagnetic fingerprint comprising a series of data values, each data value of which is indicative of a phase difference and/or an amplitude relationship between the applied stimulation signal and the received stimulation signal associated with one of the plurality of other electrodes; and
the controller is further configured to:
receive the secondary electromagnetic fingerprint;
identify a secondary interrelationship between at least some of the data values of the secondary electromagnetic fingerprint; and
determine a secondary characteristic based on the secondary interrelationship.

7. The apparatus of claim 6, wherein the controller further comprises:
a primary machine learning model trained using a training set of electromagnetic fingerprints representing a set of materials to generate trained parameters, the primary machine learning model arranged to:
receive the primary electromagnetic fingerprint as an input to the trained primary machine learning model;
identify the primary interrelationship between at least some of the data values of the first electromagnetic fingerprint using the trained parameters; and
generate, based on the primary interrelationship, data indicating the primary characteristic; and
a secondary machine learning model trained using a training set of electromagnetic fingerprints representing a set of materials to generate trained parameters, the secondary machine learning model arranged to:
receive the secondary electromagnetic fingerprint as an input to the trained secondary machine learning model;
identify the secondary interrelationship between at least some of the data values of the secondary electromagnetic fingerprint using the trained parameters; and
generate, based on the secondary interrelationship, data indicating the secondary characteristic.

8. The apparatus of claim 1, wherein only a subset of the first plurality of electrodes are used to generate an electromagnetic fingerprint.

9. The apparatus of claim 1, wherein only a subset of the series of data values are used to determine the characteristic.

10. The apparatus of claim 1, wherein the electromagnetic fingerprint comprises a phase fingerprint and the characteristic comprises liquid phase conductivity.

11. A density measurement system comprising the apparatus of claim 10, wherein the liquid phase conductivity is provided as a reference value for generating data indicative of a density of the material.

12. The density measurement system of claim 11, further comprising a third plurality of electrodes which cooperate with the controller to generate data indicative of the density of the material.

13. The apparatus of claim 1, wherein the material comprises one or more of: a mixture having a liquid phase portion and a solid phase portion, and a mixture having a gas phase portion.

14. The apparatus of claim 1, wherein the region of interest is within one or more of: a pipe through which the material is configured to flow, and a vessel configured to contain the material.

15. The apparatus of claim 1, wherein the characteristic, comprises one or more of: an indication of a presence of one or more substances in the material, a concentration of one or more substances in the material, a flow regime of the material, a stability.

16. An industrial processing apparatus comprising the apparatus of claim 1, further comprising a mining apparatus, wherein the characteristic comprises one or more of: an indication of a presence of one or more substances in the material, a concentration of one or more substances in the material.

17. An industrial processing apparatus comprising the apparatus of claim 1, further comprising a dredging apparatus, wherein the material is a slurry, and the characteristic comprises one or more of: a density of the slurry, a concentration of one or more portions of the slurry, a flow regime of the slurry.

18. An industrial processing apparatus comprising the apparatus of claim 1, further comprising a manufacturing system, wherein the material is a formulation, and the characteristic comprises one or more of: an indication of one or more substances in the formulation, a concentration of one or more substances in the formulation, a stability of a manufacturing process, a cleanliness of the manufacturing system.

19. An industrial processing apparatus comprising the apparatus of claim 1, further comprising a transport system, wherein the material comprises a mixture having a gas phase portion, and the characteristic comprises a characteristic of the gas phase portion.

20. A computer implemented method for determining a characteristic of a material within a region within a pipe or vessel, the method comprising:
receiving an electromagnetic fingerprint, the electromagnetic fingerprint being defined by a series of data values, each data value being indicative of a phase difference and/or amplitude relationship between an applied stimulation signal applied to at least one of a first plurality of electrodes mounted on an inner wall of the pipe or vessel around the region or arranged linearly along a linear structure fixably or removably located within the pipe or vessel and within the region and a received stimulation signal generated for each of a plurality of other electrodes of the first plurality of electrodes based on a monitored electrical parameter in response to said applied stimulation;
identifying an interrelationship between at least some of the data values of the electromagnetic fingerprint;
determining the characteristic based on the interrelationship.

21. The method of claim 20, wherein:
receiving the electromagnetic fingerprint comprises inputting the electromagnetic fingerprint into a trained machine learning model, wherein the trained machine learning model has been trained, using a training set of known electromagnetic fingerprints representing a set of materials, to generate trained parameters, and wherein the trained machine learning model is arranged to identify the interrelationship using the trained parameters and generate, based on the interrelationship, data indicating the characteristic;
determining the characteristic comprises receiving, as an output of the trained machine learning model, the data indicating the characteristic.

22. The method of claim 20, further comprising normalising the electromagnetic fingerprint prior to identifying the interrelationship.

23. A method of determining a stability of a material within a region, the method comprising:
performing the steps of method claim 20 over a first time period to determine a first characteristic of the material within the first time period;
performing the steps of method claim 20 over a second time period to determine a second characteristic of the material within the second time period;
comparing the first and second characteristic;
determining a stability of the material between the first time period and the second time period based on the comparison.

24. A method of determining a stability of a material within a region within a pipe or vessel, the method comprising:
receiving a first electromagnetic fingerprint, the first electromagnetic fingerprint being defined by data indicative of a phase difference and/or amplitude relationship between an applied stimulation signal applied to at least one of a first plurality of electrodes mounted on an inner wall of the pipe or vessel around the region or arranged linearly along a linear structure fixably or removably located within the pipe or vessel and within the region and a received stimulation signal generated for a plurality of other electrodes of the first plurality of electrodes based on a monitored electrical parameter in response to said applied stimulation within a first time period;
receiving a second electromagnetic fingerprint, the second electromagnetic fingerprint being defined by data indicative of a phase difference and/or amplitude relationship between an applied stimulation signal applied to at least one of the first plurality of electrodes and a received stimulation signal generated for the plurality of other electrodes of the first plurality of electrodes based on a monitored electrical parameter in response to said applied stimulation within a second time period, the second time period being later than the first time period;
comparing the first and second electromagnetic fingerprints;
determining a stability of the material between the first time period and the second time period based on the comparison.

25. The method of claim 24, further comprising:
upon determination that the stability surpasses a stability threshold, classifying the second electromagnetic fingerprint as a stable fingerprint; and
performing an action based on the determination.

* * * * *